US012812173B2

(12) United States Patent
Kishimoto et al.

(10) Patent No.: US 12,812,173 B2
(45) Date of Patent: Nov. 24, 2026

(54) MESH DECODING DEVICE, MESH ENCODING DEVICE, MESH DECODING METHOD, AND PROGRAM

(71) Applicant: KDDI CORPORATION, Tokyo (JP)

(72) Inventors: Koki Kishimoto, Fujimino (JP); Kei Kawamura, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 19/061,171

(22) Filed: Feb. 24, 2025

(65) Prior Publication Data

US 2025/0220232 A1 Jul. 3, 2025

Related U.S. Application Data

(63) Continuation of application No. PCT/JP2023/029761, filed on Aug. 17, 2023.

(30) Foreign Application Priority Data

Oct. 13, 2022 (JP) ................................ 2022-165083

(51) Int. Cl.

| | |
|---|---|
| ***H04N 19/597*** | (2014.01) |
| ***G06T 9/00*** | (2006.01) |
| ***H04N 19/124*** | (2014.01) |
| ***H04N 19/136*** | (2014.01) |
| ***H04N 19/184*** | (2014.01) |
| ***H04N 19/593*** | (2014.01) |

(52) U.S. Cl.

CPC ........... *H04N 19/597* (2014.11); *G06T 9/001* (2013.01); *H04N 19/124* (2014.11); *H04N 19/136* (2014.11); *H04N 19/184* (2014.11); *H04N 19/593* (2014.11)

(58) Field of Classification Search

None

See application file for complete search history.

(56) References Cited

U.S. PATENT DOCUMENTS

| | | | |
|---|---|---|---|
| 6,185,254 | B1 | 2/2001 | Ogata |
| 2004/0151247 | A1 | 8/2004 | Sanson et al. |
| 2004/0218824 | A1 | 11/2004 | Demaret et al. |
| 2018/0041768 | A1 | 2/2018 | Koo et al. |
| 2020/0098137 | A1 | 3/2020 | Hemmer et al. |

(Continued)

FOREIGN PATENT DOCUMENTS

| | | | |
|---|---|---|---|
| JP | H10191391 | A | 7/1998 |
| JP | 2004520744 | A | 7/2004 |

(Continued)

OTHER PUBLICATIONS

"Cfp for Dynamic mesh Coding", ISO/IEC JTC1/SC29/WG7; N00231; MPEG136.

(Continued)

*Primary Examiner* — Xiaolan Xu

(74) *Attorney, Agent, or Firm* — Holtz, Holtz & Volek PC

(57) ABSTRACT

A mesh decoding device 200 includes a circuit that: outputs a base mesh, outputs an intra prediction residual, and decodes a displacement by performing intra prediction of a displacement of a subdivided vertex based on the outputted base mesh to calculate an intra prediction value, and adding the calculated intra prediction value and the outputted intra prediction residual.

5 Claims, 49 Drawing Sheets

(56) References Cited

U.S. PATENT DOCUMENTS

| | | | |
|---|---|---|---|
| 2023/0239491 A1 | 7/2023 | Nishi et al. | |
| 2024/0054684 A1* | 2/2024 | Tokumo ............... | H04N 19/597 |

FOREIGN PATENT DOCUMENTS

| | | |
|---|---|---|
| JP | 2004537887 A | 12/2004 |
| JP | 2012068881 A | 4/2012 |
| WO | 2022075428 A1 | 4/2022 |

OTHER PUBLICATIONS

"Google Draco", Accessed on May 26, 2022, online; https://google.github.io/draco.
International Search Report (ISR) (and English language translation thereof) dated Oct. 31, 2023, issued in International Application No. PCT/JP2023/029761.
Written Opinion dated Oct. 31, 2023, issued in International Application No. PCT/JP2023/029761.
Japanese Office Action (and an English language translation thereof) dated Aug. 12, 2025, issued in counterpart Japanese Application No. 2022-165083.

* cited by examiner

1. BASE MESH
(NUMBER OF VERTICES = 5, NUMBER OF BASE FACES = 4, AND PATCH SIZE = 2)

2. SUBDIVIDED MESH

FIG. 5

| basemesh_patch_header( ) { | **Descriptor** |
|---|---|
| **mdu_face_count_minus1** | ue(v) |
| **mdu_subdivision_method_id** | ue(v) |
| **mdu_subdivision_num_method_id** | ue(v) |
| if(mdu_subdivision_num_method_id == 0){ | |
| for(i = 0; i < mdu_face_count_minus1; i++){ | |
| **mdu_subdivision_residuals** | ue(v) |
| ... | |
| } | |
| } | |
| if(mdu_subdivision_num_method_id == 1){ | |
| **mdu_max_depth** | ue(v) |
| for(i = 0; i < mdu_face_count_minus1; i++){ | |
| for(j=0; j < mdu_max_depth; j++){ | |
| **mdu_subdivision_flag** | u(1) |
| } | |
| } | |
| if(mdu_subdivision_num_method_id == 2){ | |
| **mdu_max_depth** | ue(v) |
| **mdu_subdivision_num** | ue(v) |
| } | |
| } | |
| } | |

FIG. 30
SPS
DPS
DPH
ENCODED DISPLACEMENT
DPH
ENCODED DISPLACEMENT

FIG. 31

| displacement_parameter_set( ) { | Descriptor |
|---|---|
| dps_displacement_parameter_set_id | ue(v) |
| ... | |
| interprediction_enabled_flag | u(1) |
| ... | |
| wavelet_transform_flag | u(1) |
| displacement_prediction_addition_flag | u(1) |
| } | |

FIG. 32

| | |
|---|---|
| last_sig_coeff_prefix | PREFIX OF COORDINATE POSITION OF LEADING NON-ZERO COEFFICIENT IN SCAN ORDER |
| last_sig_coeff_suffix | SUFFIX OF COORDINATE POSITION OF LEADING NON-ZERO COEFFICIENT IN SCAN ORDER |
| coded_block_flag | FLAG INDICATING THAT THERE IS NON-ZERO COEFFICIENT IN BLOCK |
| last_sig_coeff_block_prefix | PREFIX OF COORDINATE POSITION OF LEADING NON-ZERO COEFFICIENT IN SCAN ORDER IN BLOCK |
| last_sig_coeff_block_suffix | SUFFIX OF COORDINATE POSITION OF LEADING NON-ZERO COEFFICIENT IN SCAN ORDER IN BLOCK |
| sig_coeff_flag | FLAG INDICATING WHETHER OR NOT COEFFICIENT IS NON-ZERO COEFFICIENT |
| coeff_abs_level_greater1_flag | FLAG INDICATING WHETHER OR NOT ABSOLUTE VALUE OF COEFFICIENT IS 2 OR MORE (UP TO EIGHT) |
| coeff_abs_level_greater2_flag | FLAG INDICATING WHETHER OR NOT ABSOLUTE VALUE OF COEFFICIENT IS 3 OR MORE (ONE) |
| coeff_sign_flag | FLAG INDICATING POSITIVE OR NEGATIVE SIGN OF COEFFICIENT (0: POSITIVE AND 1: NEGATIVE) |
| coeff_abs_level_remaining | VALUE OBTAINED BY SUBTRACTING VALUE EXPRESSED BY ABOVE FLAG FROM ABSOLUTE VALUE OF COEFFICIENT |

FIG. 33

| PREFIX VALUE | PREFIX PORTION CODE STRING | SUFFIX PORTION CODE STRING | COORDINATE VALUE |
|---|---|---|---|
| 0 | 1 | - | 0 |
| 1 | 10 | - | 1 |
| 2 | 110 | - | 2 |
| 3 | 1110 | - | 3 |
| 4 | 11110 | x | 4-5 |
| 5 | 111110 | x | 6-7 |
| 6 | 1111110 | xx | 8-11 |
| 7 | 11111110 | xx | 12-15 |
| 8 | 111111110 | xxx | 16-23 |
| 9 | 111111111 | xxx | 24-31 |

FIG. 34

| PREFIX PORTION CODE STRING | SUFFIX PORTION CODE STRING | |
|---|---|---|
| | FIXED LENGTH CODE (k BITS) | CODE BY CODE LENGTH OF PREFIX PORTION |
| 0 | x ... x | - |
| 10 | x ... x | x |
| 110 | x ... x | xx |
| 1110 | x ... x | xxx |
| 11110 | x ... x | xxxx |
| ... | ... | |

FIG. 35

| | BLOCK 3 | BLOCK 2 | BLOCK 1 |
|---|---|---|---|
| last_sig_coeff_prefix | 62 | | |
| last_sig_coeff_suffix | 30 | | |
| coded_block_flag | 1 | 0 | 1 |
| last_sig_coeff_block_prefix | 61 | - | 30 |
| last_sig_coeff_block_suffix | 10 | - | 00 |
| sig_coeff_flag | 10101 | - | 1100111111 |
| coeff_abs_level_greater1_flag | 0 - 0 - 1 | - | 00 - - 111111 |
| coeff_abs_level_greater2_flag | 0 | - | 1 |
| coeff_sign_flag | 0 - 1 - 0 | - | 00 - - 010100 |
| coeff_abs_level_remaining | - - - - - | - | - - - - 11756914 |

⇩

| | | | | | | | | | | | | |
|---|---|---|---|---|---|---|---|---|---|---|---|---|
| BLOCK 3 | 0 | 0 | 0 | 0 | 0 | 0 | 0 | +1 | 0 | -1 | 0 | +2 |
| BLOCK 2 | 0 | 0 | 0 | 0 | 0 | 0 | 0 | 0 | 0 | 0 | 0 | 0 |
| BLOCK 1 | 0 | 0 | +1 | +1 | 0 | 0 | +14 | -10 | +8 | -9 | +12 | +17 |

FIG. 36

DECODING ORDER

| | | | | | | | | | | | | |
|---|---|---|---|---|---|---|---|---|---|---|---|---|
| x COORDINATE | +17 | +8 | 0 | +1 | 0 | 0 | 0 | 0 | +2 | 0 | 0 | 0 |
| y COORDINATE | +12 | +10 | 0 | 0 | 0 | 0 | 0 | 0 | 0 | +1 | 0 | 0 |
| z COORDINATE | -9 | +14 | +1 | 0 | 0 | 0 | 0 | 0 | -1 | 0 | 0 | 0 |

FIG. 37

| displacement_patch_header( ) { | Descriptor |
|---|---|
| dph_displacement_parameter_set_id | ue(v) |
| ... | |
| subdivision_method_id | u(v) |
| ... | |
| patch_id | u(v) |
| ... | |
| subdivided_vertex_ids? | ue(v) |
| ... | |
| } | |

FIG. 38

| BLOCK/MATRIX SIZE | BIT POSITION | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| d x 32 | 0 | 1 | 2 | 3 | 4 | 5 | 6 | 7 | 8 | - | - | - |
| d x 64 | 9 | 10 | 11 | 12 | 13 | 14 | 15 | 16 | 17 | 18 | - | - |
| d x 128 | 19 | 20 | 21 | 22 | 23 | 24 | 25 | 26 | 27 | 28 | 29 | 30 |

FIG. 40-1

CASE WHERE RIGHT ADJACENT BLOCK coded_block_flag = 0

| | | | |
|---|---|---|---|
| +2 | +1 | 0 | 0 |
| +2 | +1 | 0 | 0 |
| +2 | +1 | 0 | 0 |

FIG. 40-2

CASE WHERE RIGHT ADJACENT BLOCK coded_block_flag = 1

| | | | |
|---|---|---|---|
| +2 | +2 | +2 | +2 |
| +2 | +2 | +2 | +2 |
| +2 | +2 | +2 | +2 |

FIG. 40-3

CASE WHERE RIGHT ADJACENT BLOCK coded_block_flag = 0

| | | | | | | | |
|---|---|---|---|---|---|---|---|
| +3 | +3 | +2 | +2 | +1 | +1 | 0 | 0 |
| +3 | +3 | +2 | +2 | +1 | +1 | 0 | 0 |
| +3 | +3 | +2 | +2 | +1 | +1 | 0 | 0 |

FIG. 43

REFERENCE FRAME

| | | | | | | | | |
|---|---|---|---|---|---|---|---|---|
| SUBDIVIDED VERTEX | 7 | 4 | 1 | 2 | 5 | 8 | 3 | 6 |
| DECODED DISPLACEMENT | +3 | +2 | +1 | 0 | 0 | -1 | -1 | -2 |

CORRESPONDENCE

...

FRAME TO BE DECODED

| | | | | | | | | |
|---|---|---|---|---|---|---|---|---|
| SUBDIVIDED VERTEX | 1 | 2 | 3 | 4 | 5 | 6 | 7 | 8 |
| PREDICTED DISPLACEMENT | +1 | 0 | -1 | +2 | 0 | -2 | +3 | -1 |

MESH DECODING DEVICE, MESH ENCODING DEVICE, MESH DECODING METHOD, AND PROGRAM

CROSS-REFERENCE TO RELATED APPLICATIONS

The present application is a continuation of PCT Application No. PCT/JP2023/029761, filed on Aug. 17, 2023, which claims the benefit of Japanese patent application No. 2022-165083 filed on Oct. 13, 2022, the entire contents of each application being incorporated herein by reference in its entirety.

TECHNICAL FIELD

The present invention relates to a mesh decoding device, a mesh encoding device, a mesh decoding method, and a program.

BACKGROUND ART

Non Patent Literature 1: "Cfp for Dynamic Mesh Coding, ISO/IEC JTC1/SC29/WG7 N00231, MPEG136—Online" discloses a technology for encoding a mesh using Non Patent Literature 2: "Google Draco, accessed on May 26, 2022, [Online], https://google.github.io/draco".

SUMMARY OF THE INVENTION

However, in the related art, since the coordinates and connectivity information of all the vertices included in the dynamic mesh are losslessly encoded, there is a problem that the amount of information cannot be reduced even under a condition where loss is allowed, and encoding efficiency is low. Therefore, the present invention has been made in view of the above-described problems, and an object of the present invention is to provide a mesh decoding device, a mesh encoding device, a mesh decoding method, and a program capable of improving mesh encoding efficiency.

The first aspect of the present invention is summarized as a mesh decoding device including a circuit that: outputs a base mesh, outputs an intra prediction residual, and decodes a displacement by performing intra prediction of a displacement of a subdivided vertex based on the outputted base mesh to calculate an intra prediction value, and adding the calculated intra prediction value and the outputted intra prediction residual.

The second aspect of the present invention is summarized as a mesh decoding method including: decoding a base mesh bit stream and generating and outputting a base mesh; performing inverse quantization on a quantized intra prediction residual and outputting an intra prediction residual; predicting a displacement of a subdivided vertex based on the base mesh output in the decoding and calculating an intra prediction value; and decoding the displacement by adding the intra prediction residual output in the performing and the intra prediction value calculated in the predicting.

The third aspect of the present invention is summarized as a program stored on a non-transitory computer-readable medium for causing a computer to function as a mesh decoding device, wherein the mesh decoding device includes a circuit that: outputs a base mesh, outputs an intra prediction residual, and decodes a displacement by performing intra prediction of a displacement of a subdivided vertex based on the outputted base mesh to calculate an intra prediction value, and adding the calculated intra prediction value and the outputted intra prediction residual.

According to the present invention, it is possible to provide a mesh decoding device, a mesh encoding device, a mesh decoding method, and a program capable of improving mesh encoding efficiency.

BRIEF DESCRIPTION OF THE DRAWINGS

FIG. 5 is a diagram illustrating an example of a syntax configuration of a base patch header (BPH).

Figure 16:
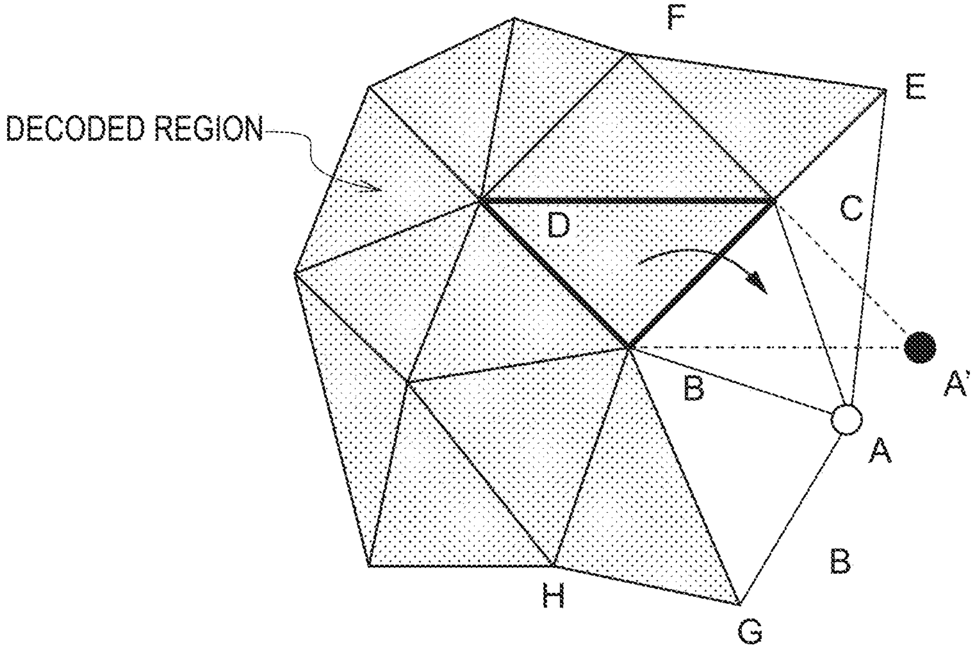

FIG. 16 is a diagram for explaining an example of parallelogram prediction.

Figure 17:
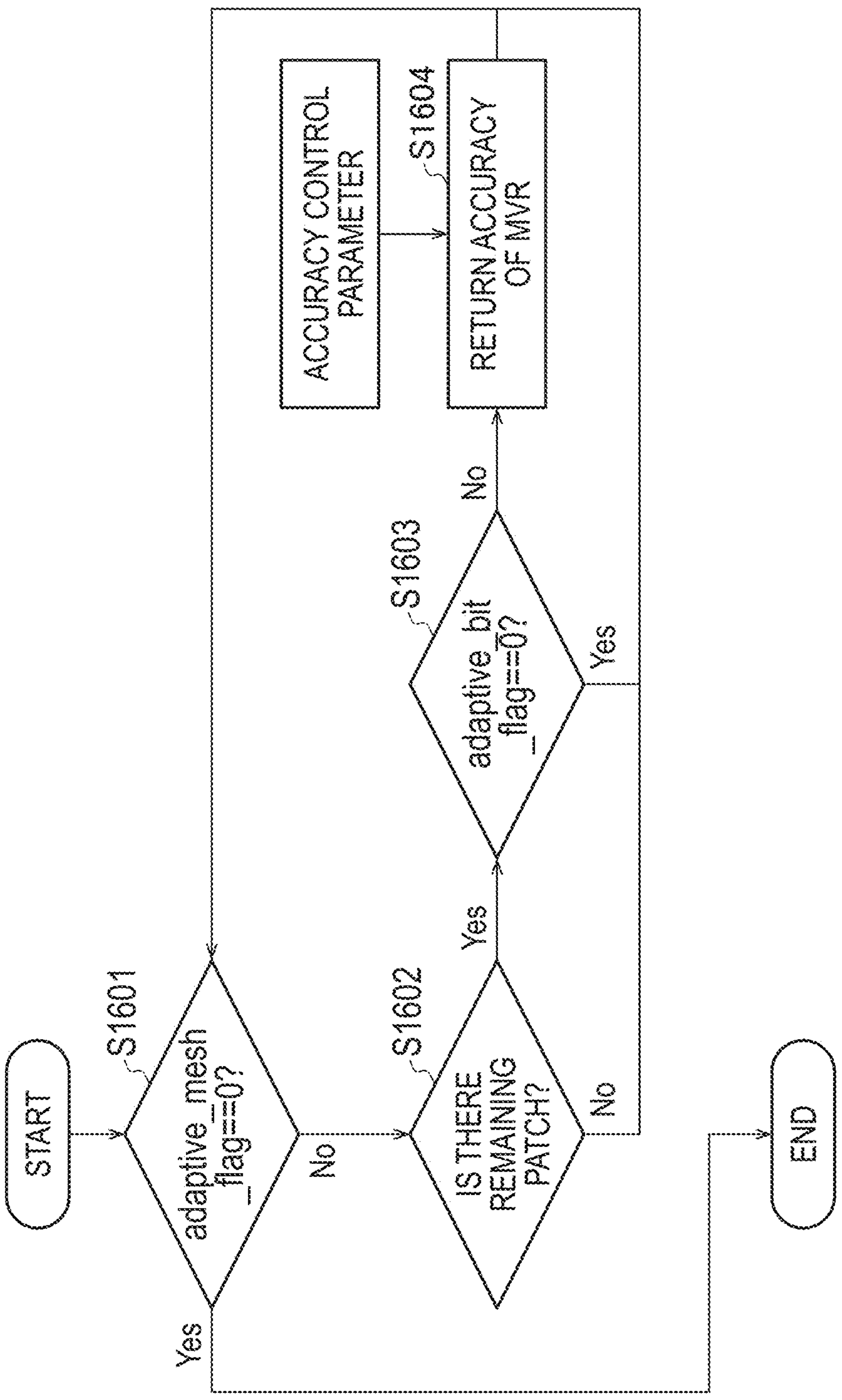

FIG. 17 is a flowchart illustrating an example of an operation of returning motion vector residual (MVR) accuracy to original bit accuracy from adaptive_mesh_flag, adaptive_bit_flag, and an accuracy control parameter that are control information generated by decoding the base mesh bit stream.

Figure 18:
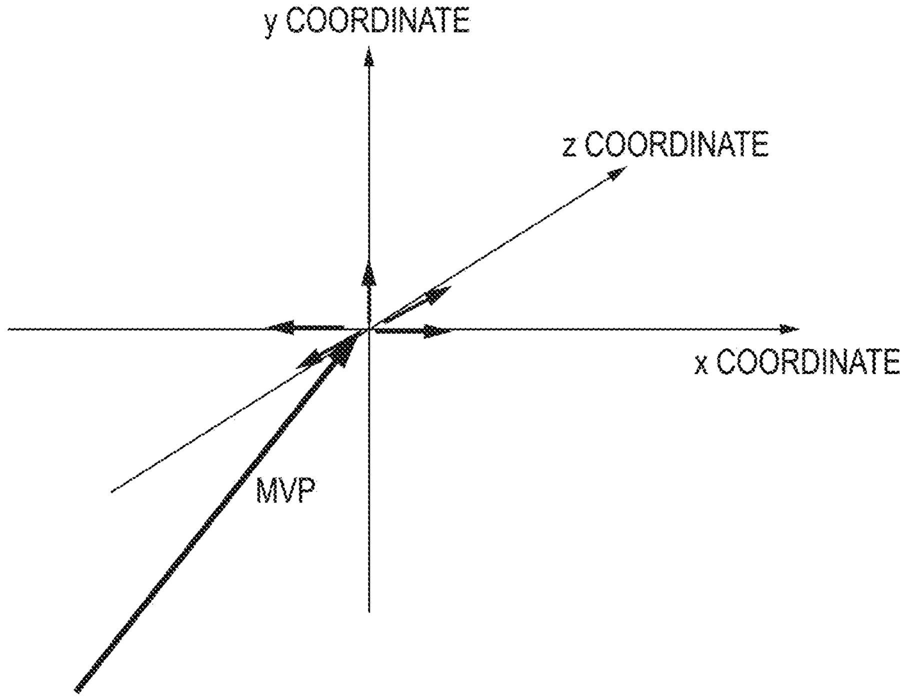

FIG. 18 is a diagram for explaining an example of MVR encoding.

Figure 19:
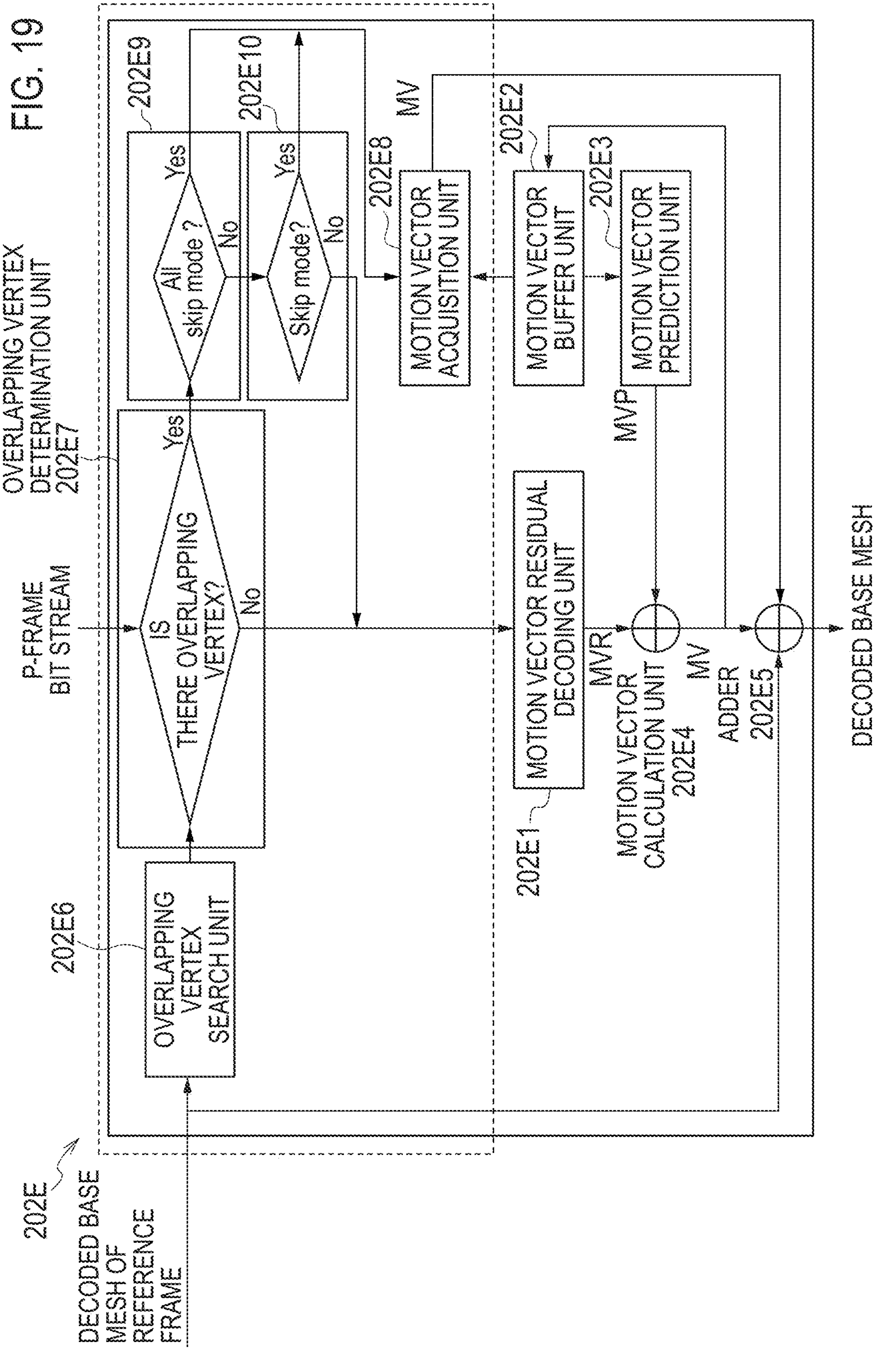

FIG. 19 is a diagram illustrating an example of functional blocks of the inter decoding unit 202E of the base mesh decoding unit 202 of the mesh decoding device 200 according to an embodiment.

Figure 20:
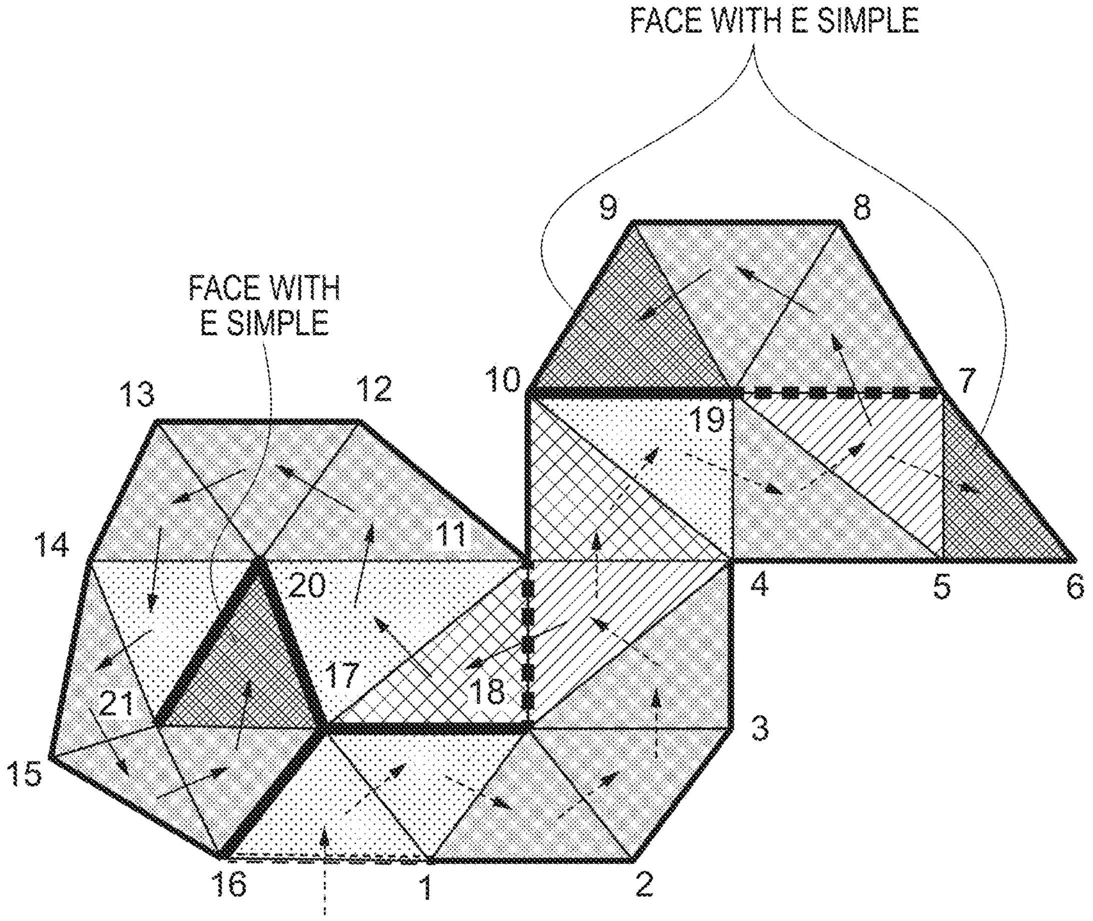

FIG. 20 is a diagram illustrating an example of an operation of determining connectivity information and an order of vertices using Edgebreaker.

Figure 21:
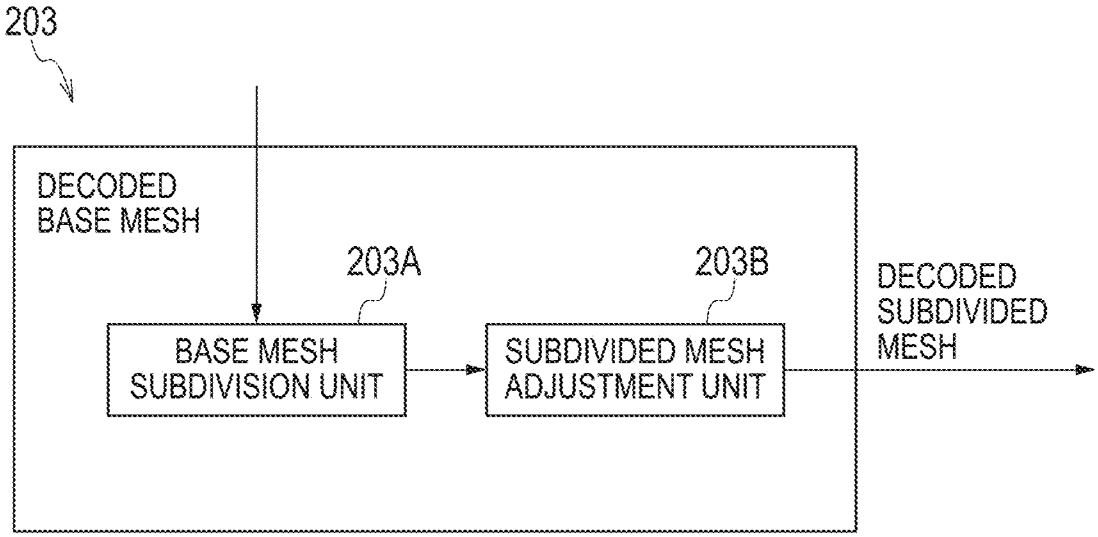

FIG. 21 is a diagram illustrating an example of functional blocks of a subdivision unit 203 of the mesh decoding device 200 according to an embodiment.

Figure 22:
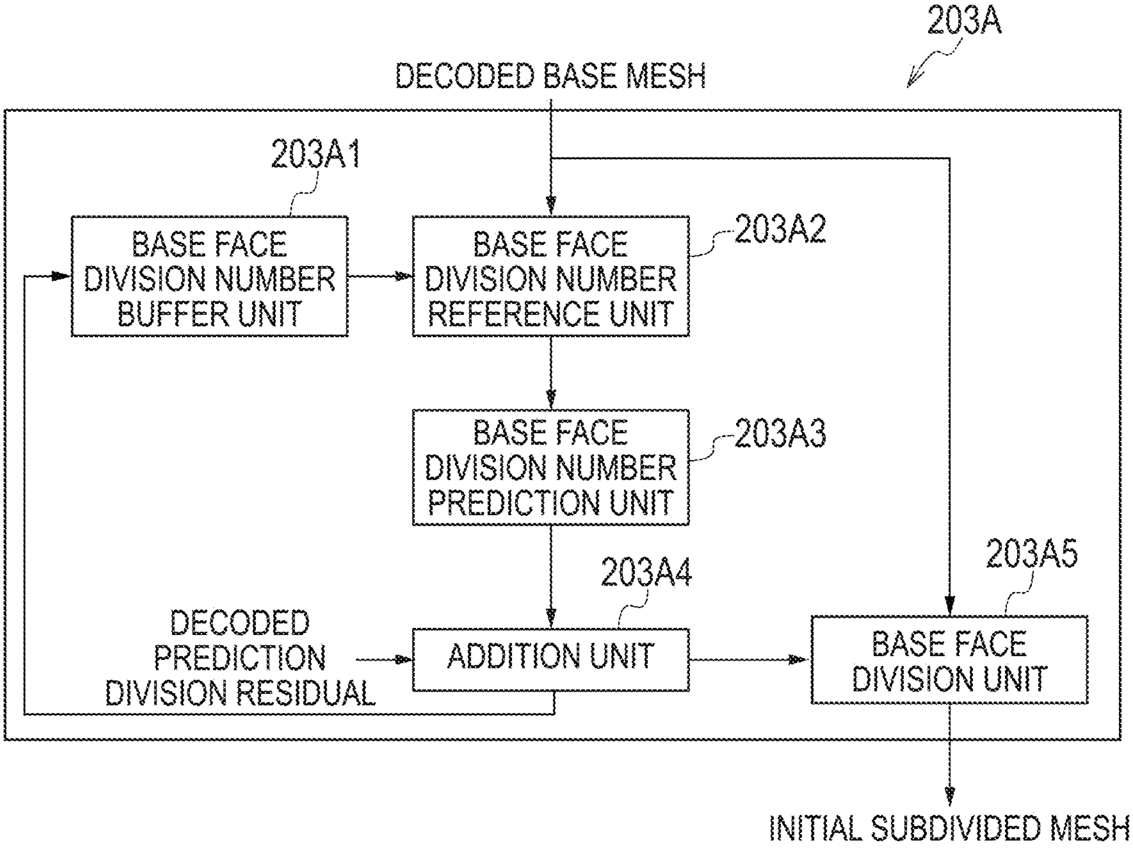

FIG. 22 is a diagram illustrating an example of functional blocks of a base mesh subdivision unit 203A of the subdivision unit 203 of the mesh decoding device 200 according to an embodiment.

Figure 23:
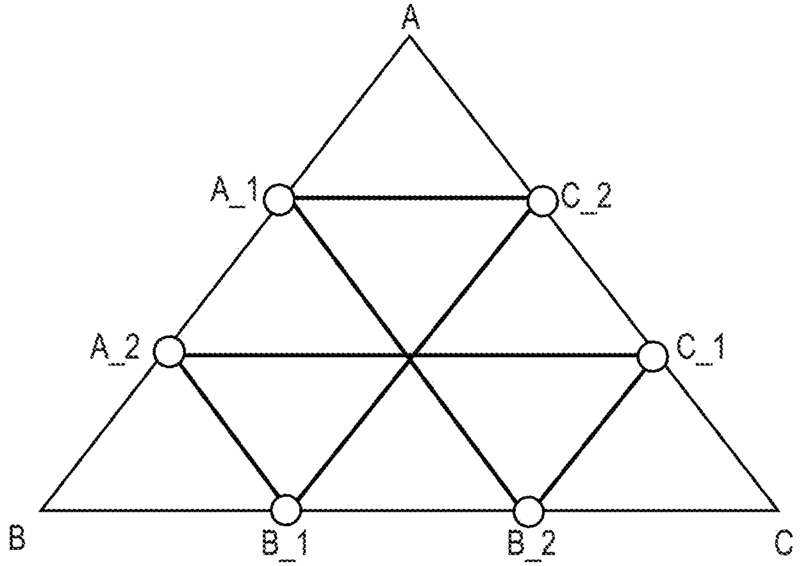

FIG. 23 is a diagram for explaining an example of a method of dividing a base face by a base face division unit 203A5 of the base mesh subdivision unit 203A of the subdivision unit 203 of the mesh decoding device 200 according to an embodiment.

Figure 24:
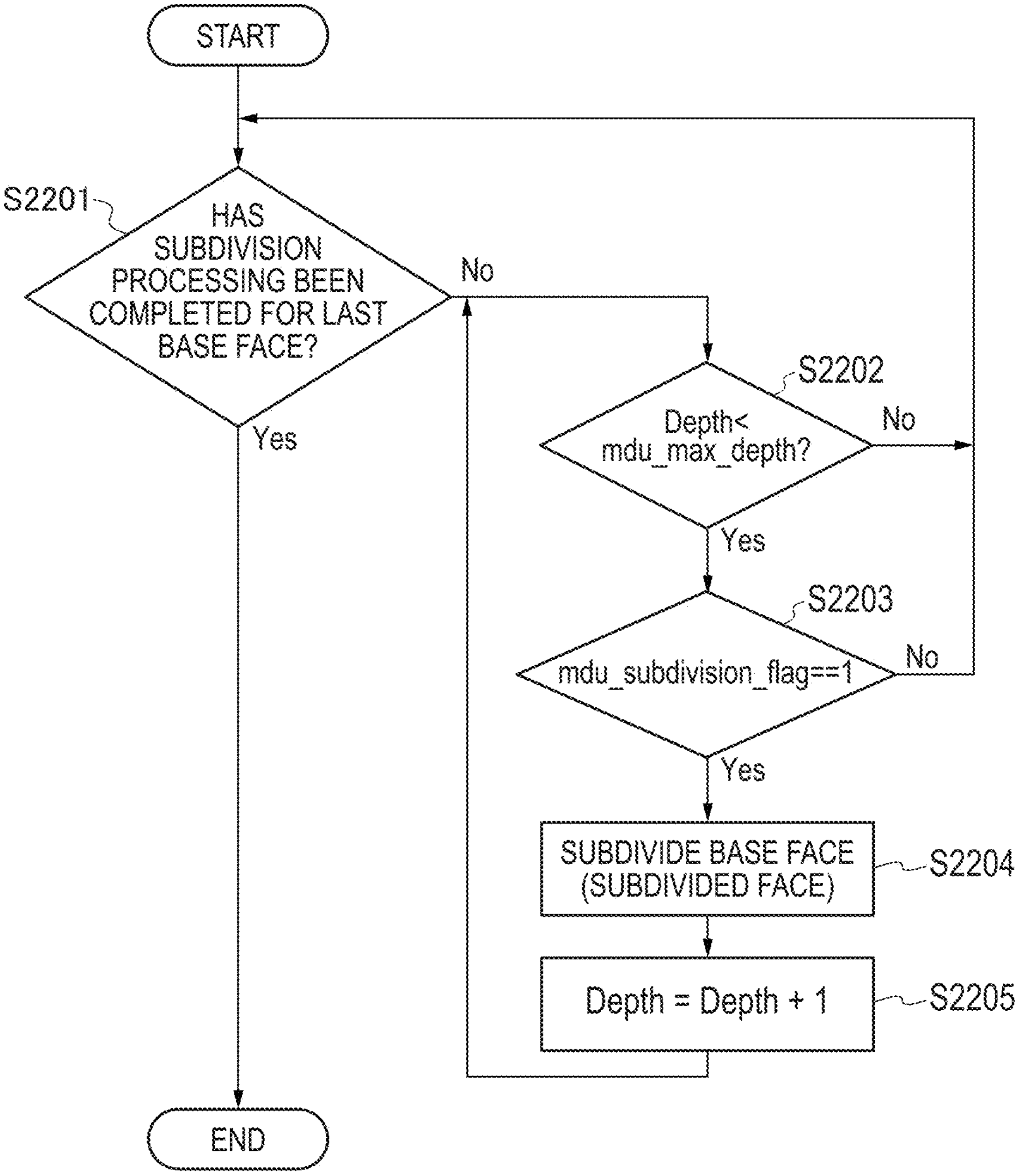

FIG. 24 is a flowchart illustrating an example of an operation of the base mesh subdivision unit 203A of the subdivision unit 203 of the mesh decoding device 200 according to an embodiment.

Figure 25:
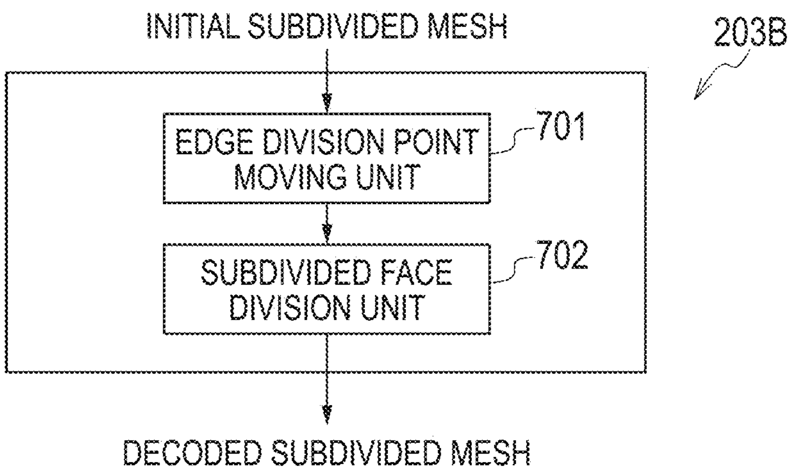

FIG. 25 is a diagram illustrating an example of functional blocks of a subdivided mesh adjustment unit 203B of the subdivision unit 203 of the mesh decoding device 200 according to an embodiment.

Figure 26:
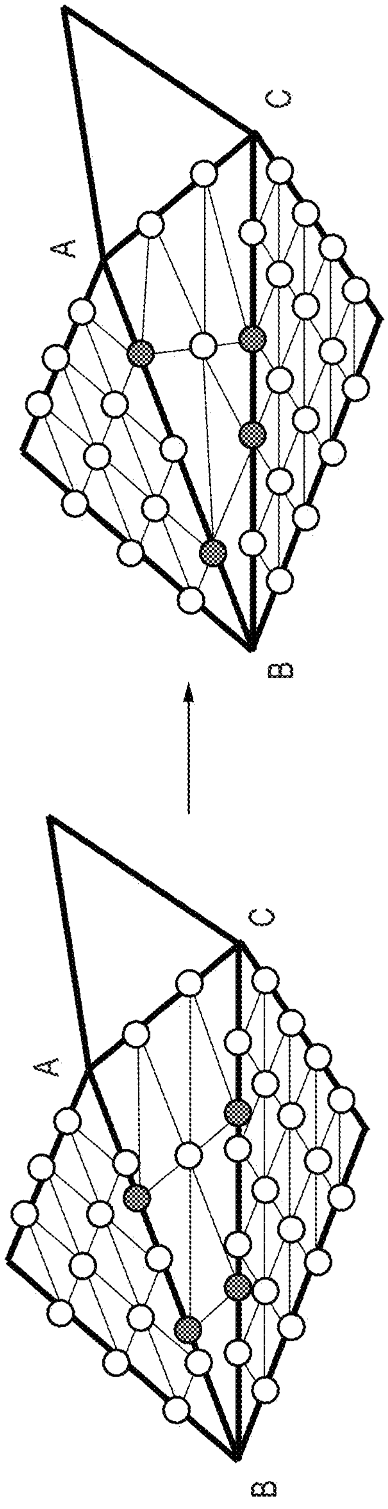

FIG. 26 is a diagram illustrating an example of a case where an edge division point on a base face ABC is moved by an edge division point moving unit 701 of the subdivided mesh adjustment unit 203B of the subdivision unit 203 of the mesh decoding device 200 according to an embodiment.

Figure 27:
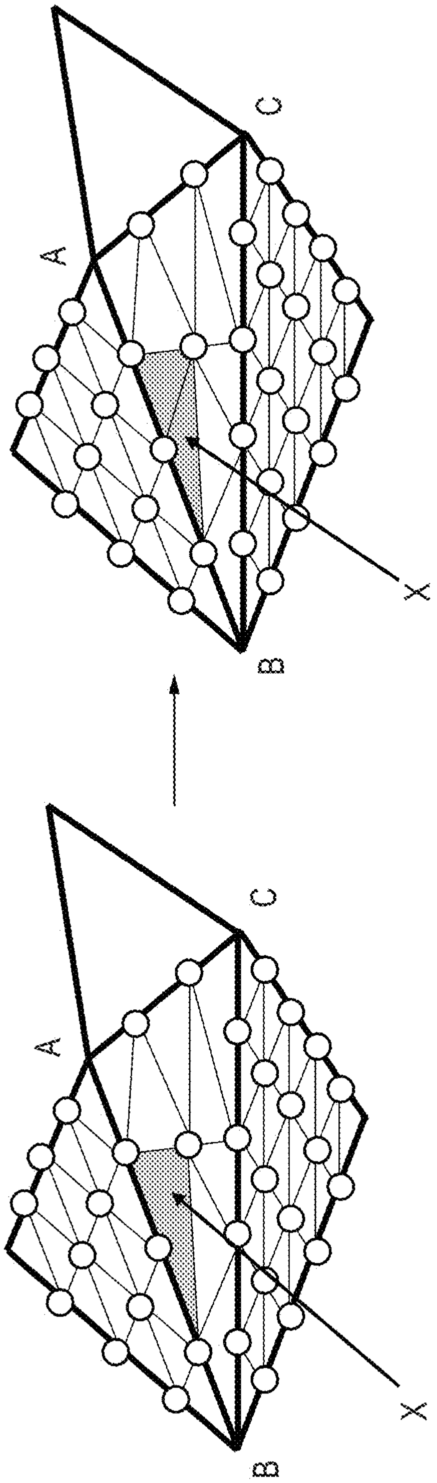

FIG. 27 is a diagram illustrating an example of a case where a subdivided face X in the base face is subdivided again by a subdivided face division unit 702 of the subdivided mesh adjustment unit 203B of the subdivision unit 203 of the mesh decoding device 200 according to an embodiment.

Figure 28:
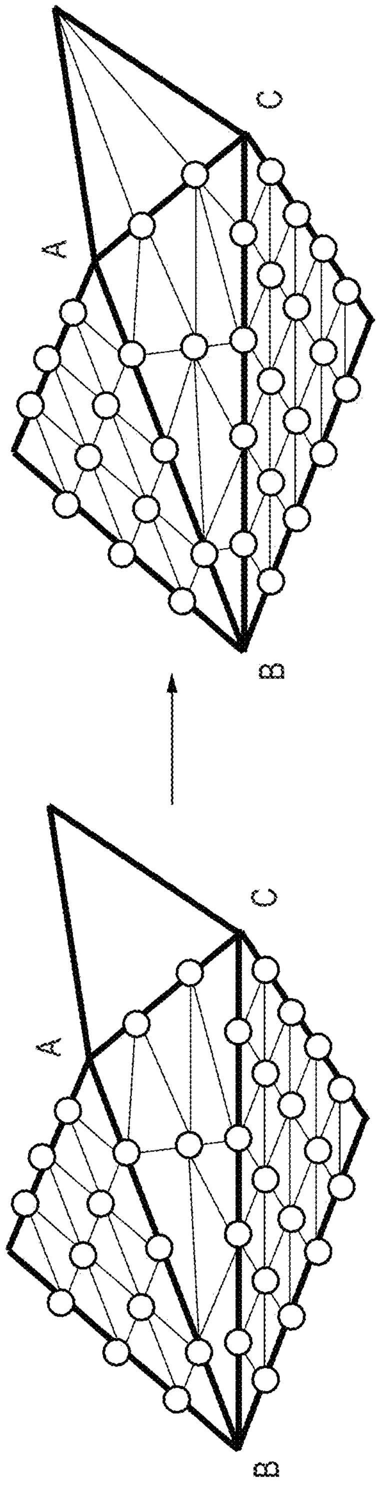

FIG. 28 is a diagram illustrating an example of a case where all the subdivided faces are subdivided again by the subdivided face division unit 702 of the subdivided mesh adjustment unit 203B of the subdivision unit 203 of the mesh decoding device 200 according to an embodiment.

Figure 29:
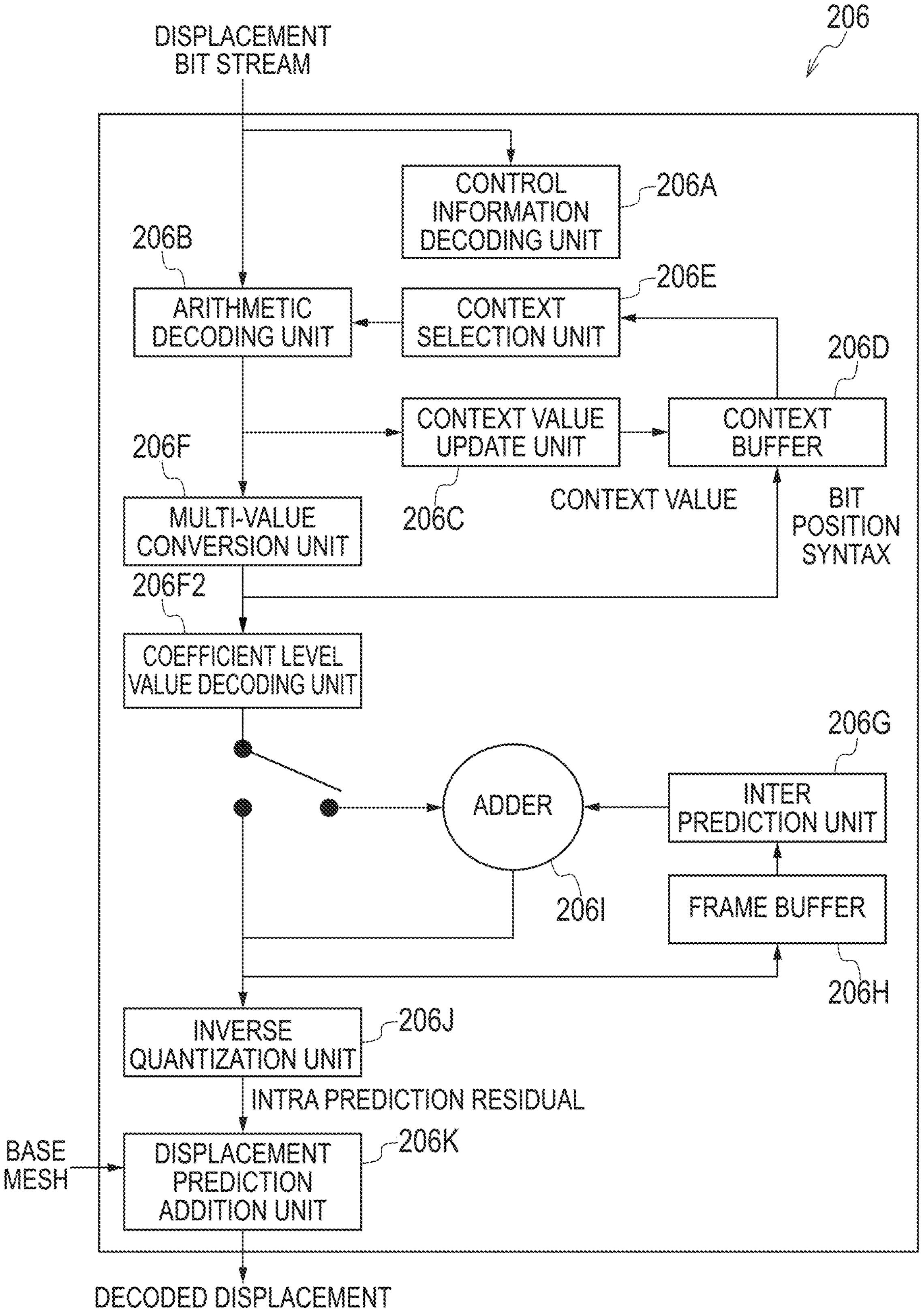

FIG. 29 is a diagram illustrating an example of functional blocks of a displacement decoding unit 206 of the mesh decoding device 200 according to an embodiment.

Figure 30:

FIG. 30 is a diagram illustrating an example of a configuration of a displacement bit stream.

FIG. 31 is a diagram illustrating an example of a syntax configuration of a displacement parameter set (DPS).

FIG. 32 is a diagram illustrating an example of a syntax configuration.

FIG. 33 is a diagram illustrating a prefix code string and a suffix code string in a case where a maximum value is 32.

FIG. 34 is a diagram illustrating a prefix code string and a suffix code string according to a k-th order exponential Golomb code.

FIG. 35 is a diagram illustrating a specific example of a syntax configuration.

FIG. 36 is a diagram illustrating a specific example of a syntax configuration.

FIG. 37 is a diagram illustrating an example of a syntax configuration of a displacement patch header (DPH).

FIG. 38 is a diagram for explaining an operation of a context selection unit 206E of the mesh decoding device 200 according to an embodiment.

Figure 39:
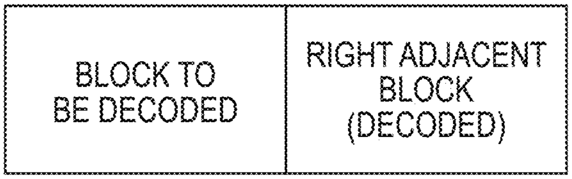

FIG. 39 is a diagram for explaining an operation of the context selection unit 206E of the mesh decoding device 200 according to an embodiment.

FIGS. 40-1, 40-2 and 40-3 are diagrams for explaining an operation of the context selection unit 206E of the mesh decoding device 200 according to an embodiment.

Figure 41:
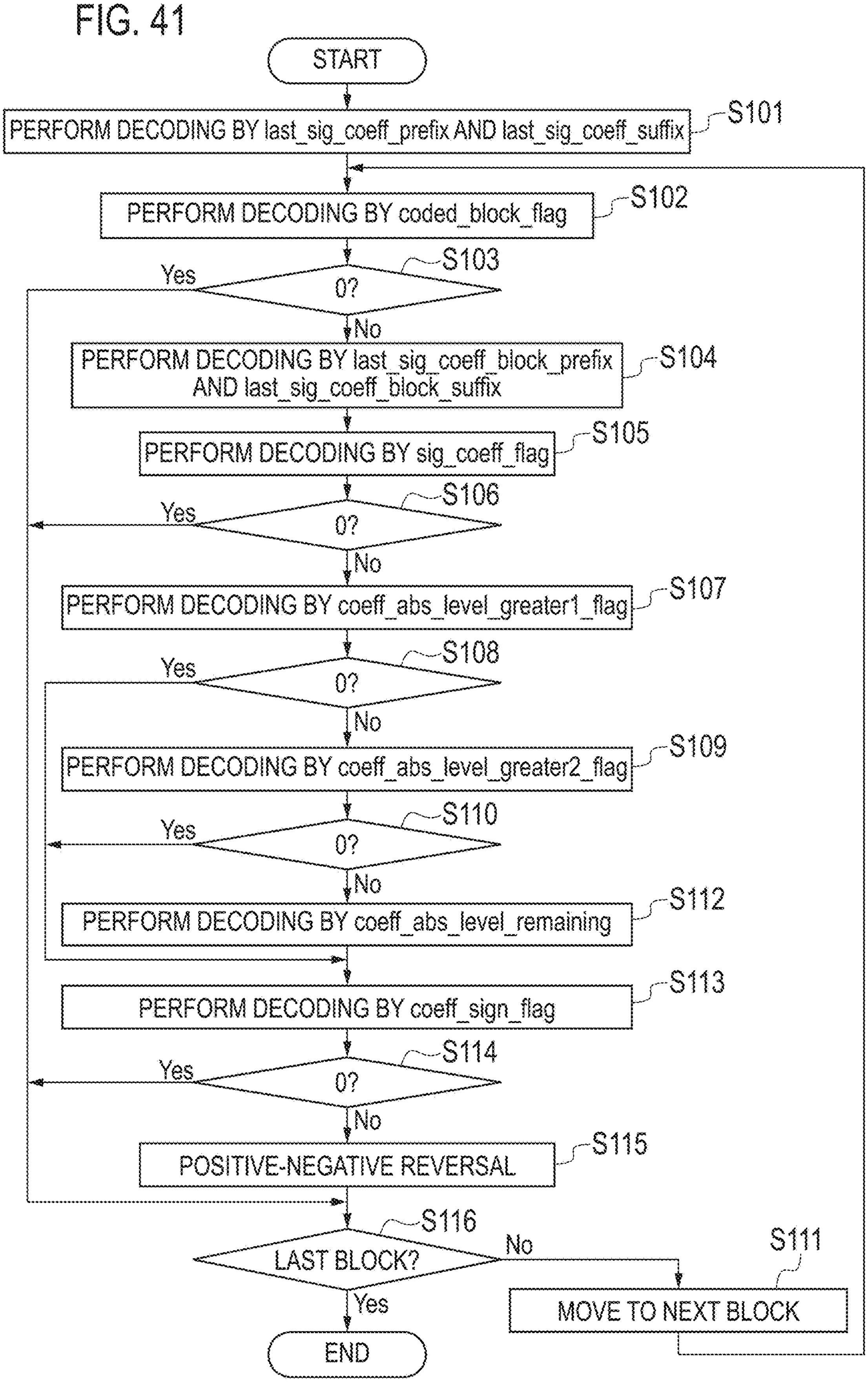

FIG. 41 is a flowchart illustrating an example of an operation of a coefficient level value decoding unit 206F2.

Figure 42:
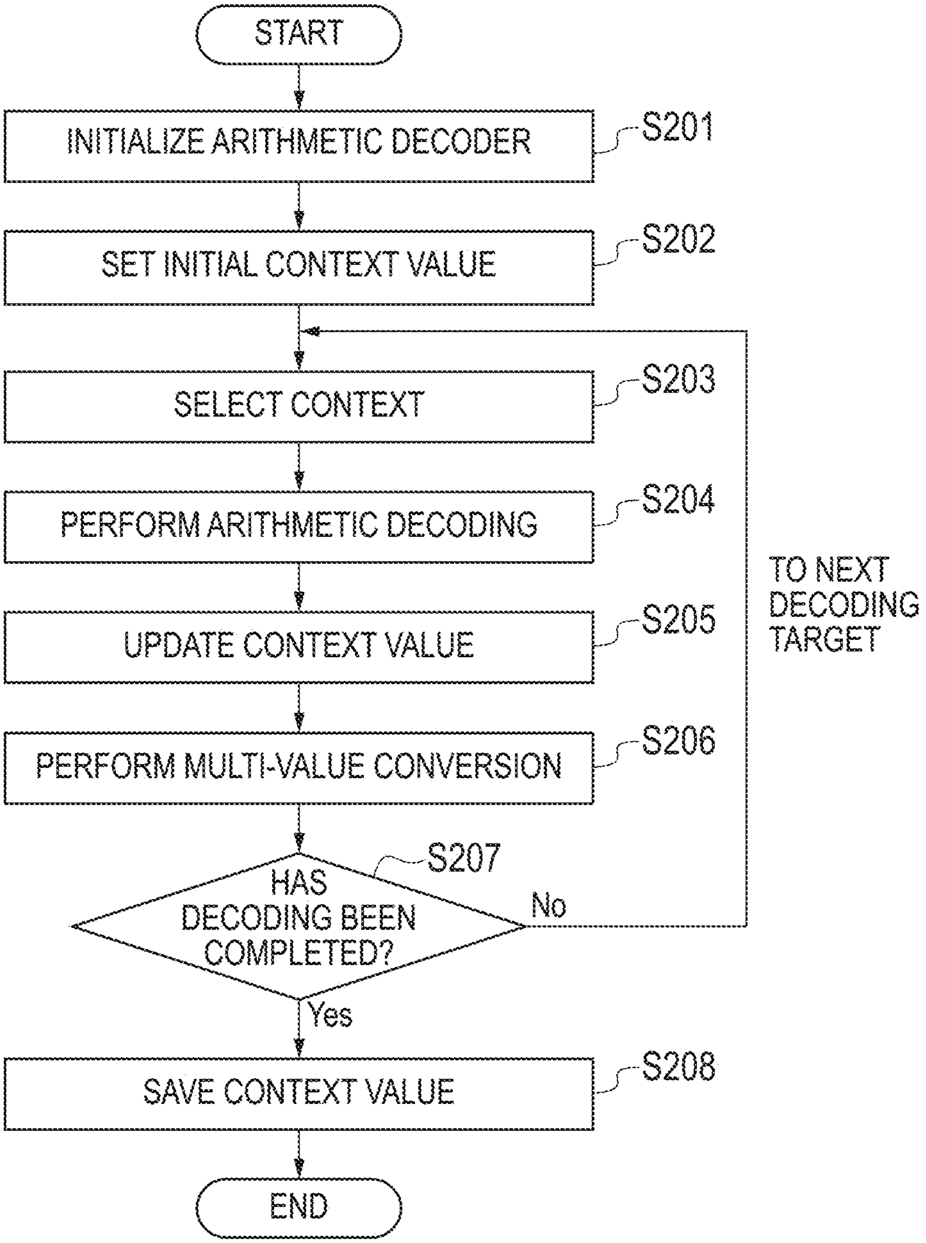

FIG. 42 is a flowchart illustrating an example of operations of an arithmetic decoding unit 206B, the context selection unit 206E, a context value update unit 206C, and a multi-value conversion unit 206F.

FIG. 43 is a diagram for explaining an example of a correspondence of subdivided vertices between a reference frame and a frame to be decoded in a case where inter-prediction is performed in a spatial domain.

Figure 44:
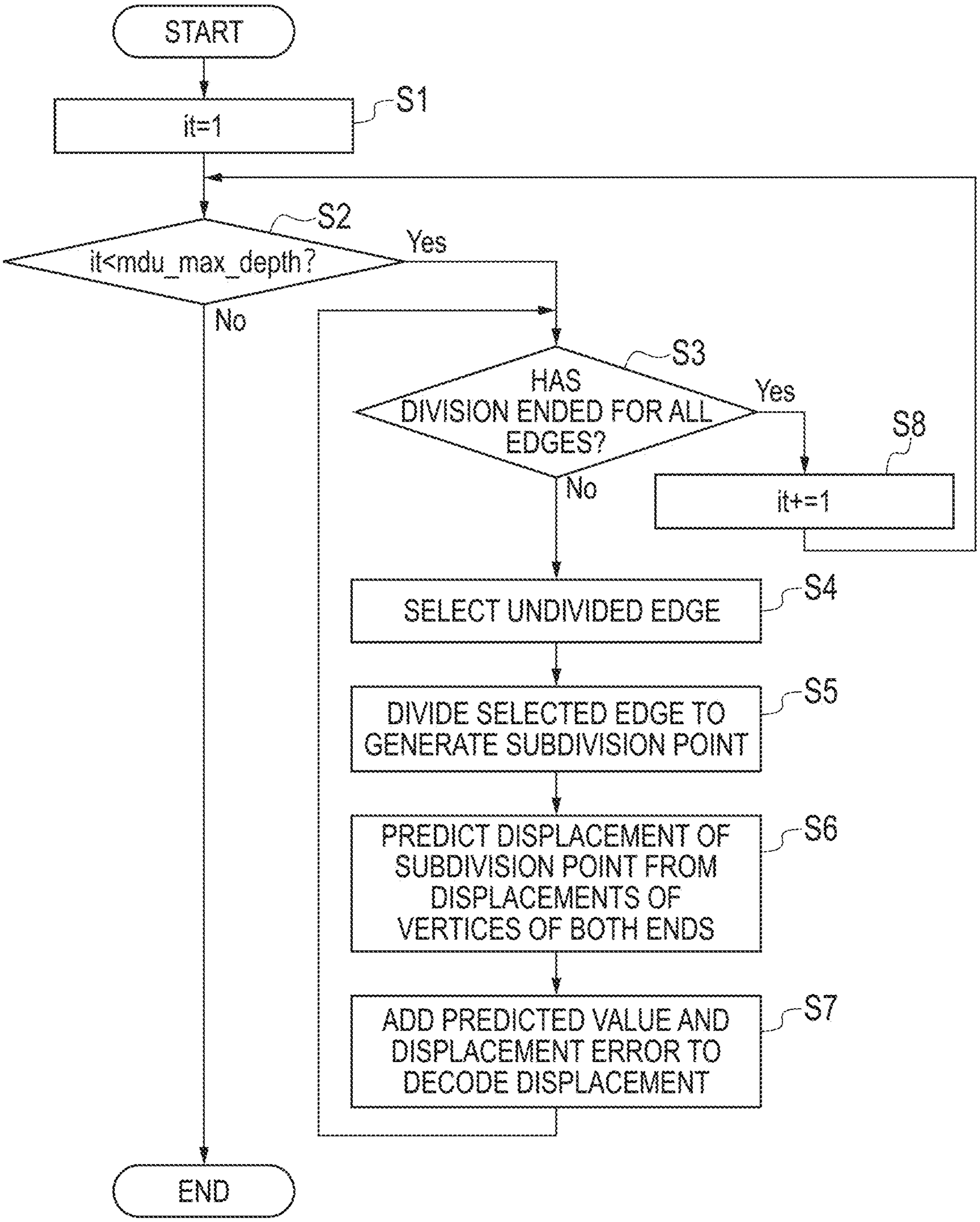

FIG. 44 is a flowchart illustrating an example of an operation of a displacement prediction addition unit 206K.

Figure 45:
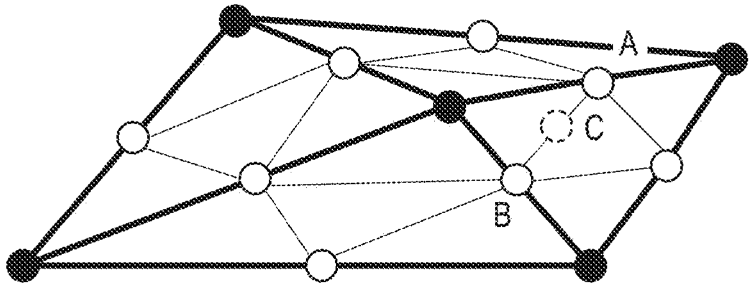

FIG. 45 is a diagram schematically illustrating an example in which a segment AB is divided by a mid-edge division method to generate a subdivided vertex C.

Figure 46:
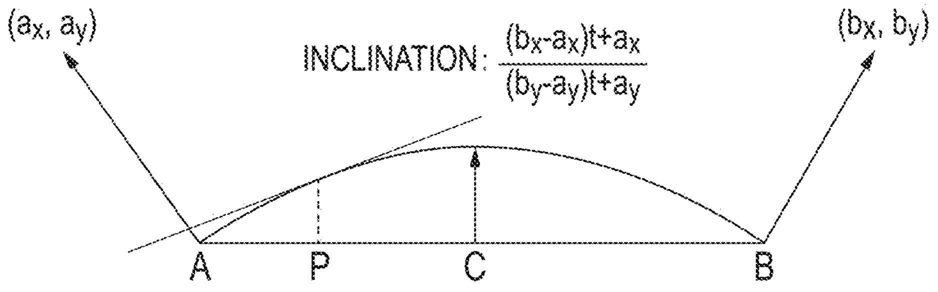

FIG. 46 is a diagram schematically illustrating an example of calculating a displacement of the subdivided vertex C.

Figure 47:
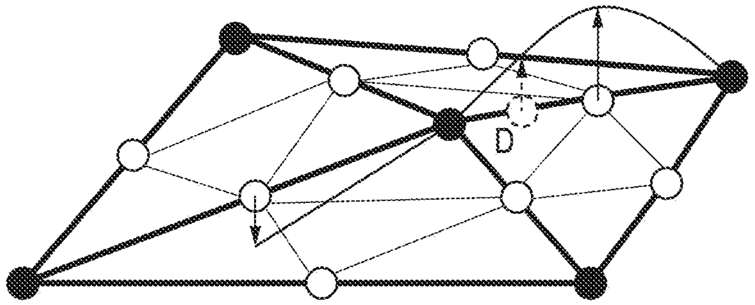

FIG. 47 is a diagram illustrating an example of predicting a displacement of a subdivided vertex D using cubic interpolation.

Figure 48:
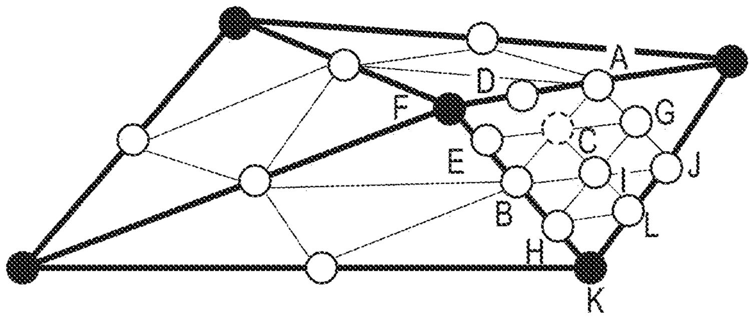

FIG. 48 is a diagram illustrating an example of dividing an edge KB, an edge BJ, an edge JK, an edge BF, and an edge FA by the mid-edge division method, and then generating the subdivided vertex C by dividing an edge AB.

Figure 49:
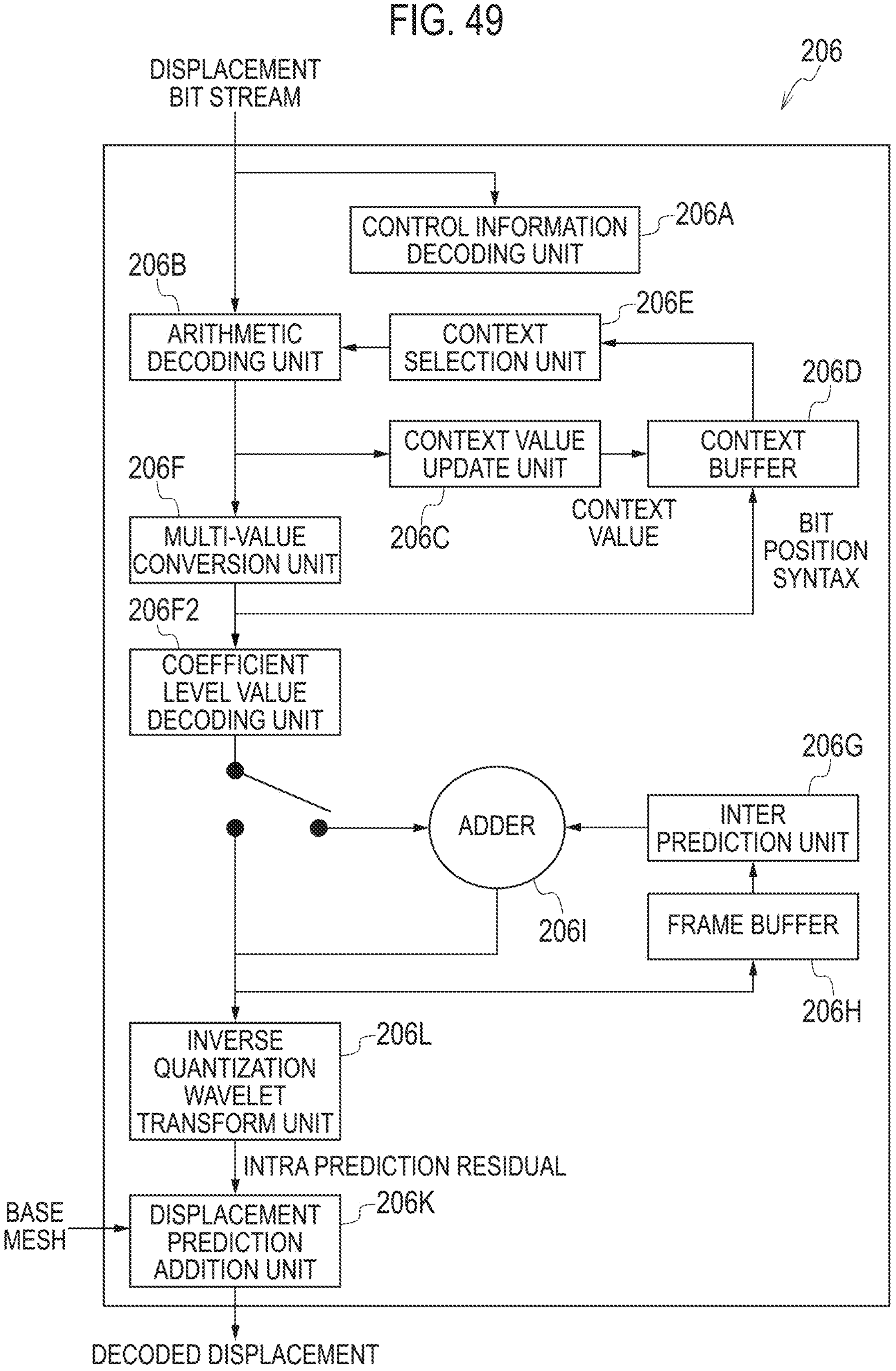

FIG. 49 is a diagram illustrating an example of functional blocks of a displacement decoding unit 206 according to a first modification.

DESCRIPTION OF EMBODIMENTS

An embodiment of the present invention will be described hereinbelow with reference to the drawings. Note that the constituent elements of the embodiment below can, where appropriate, be substituted with existing constituent elements and the like, and that a wide range of variations, including combinations with other existing constituent elements, is possible. Therefore, there are no limitations placed on the content of the invention as in the claims on the basis of the disclosures of the embodiment hereinbelow.

First Embodiment

Hereinafter, a mesh processing system according to the present embodiment will be described with reference to FIGS. 1 to 48.

Figure 1:
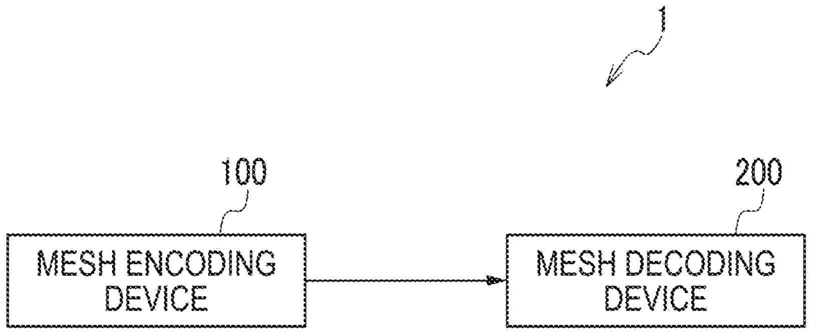
FIG. 1 is a diagram illustrating an example of a configuration of a mesh processing system 1 according to an embodiment.

FIG. 1 is a diagram illustrating an example of a configuration of a mesh processing system 1 according to the present embodiment. As illustrated in FIG. 1, the mesh processing system 1 includes a mesh encoding device 100 and a mesh decoding device 200.

Figure 2:
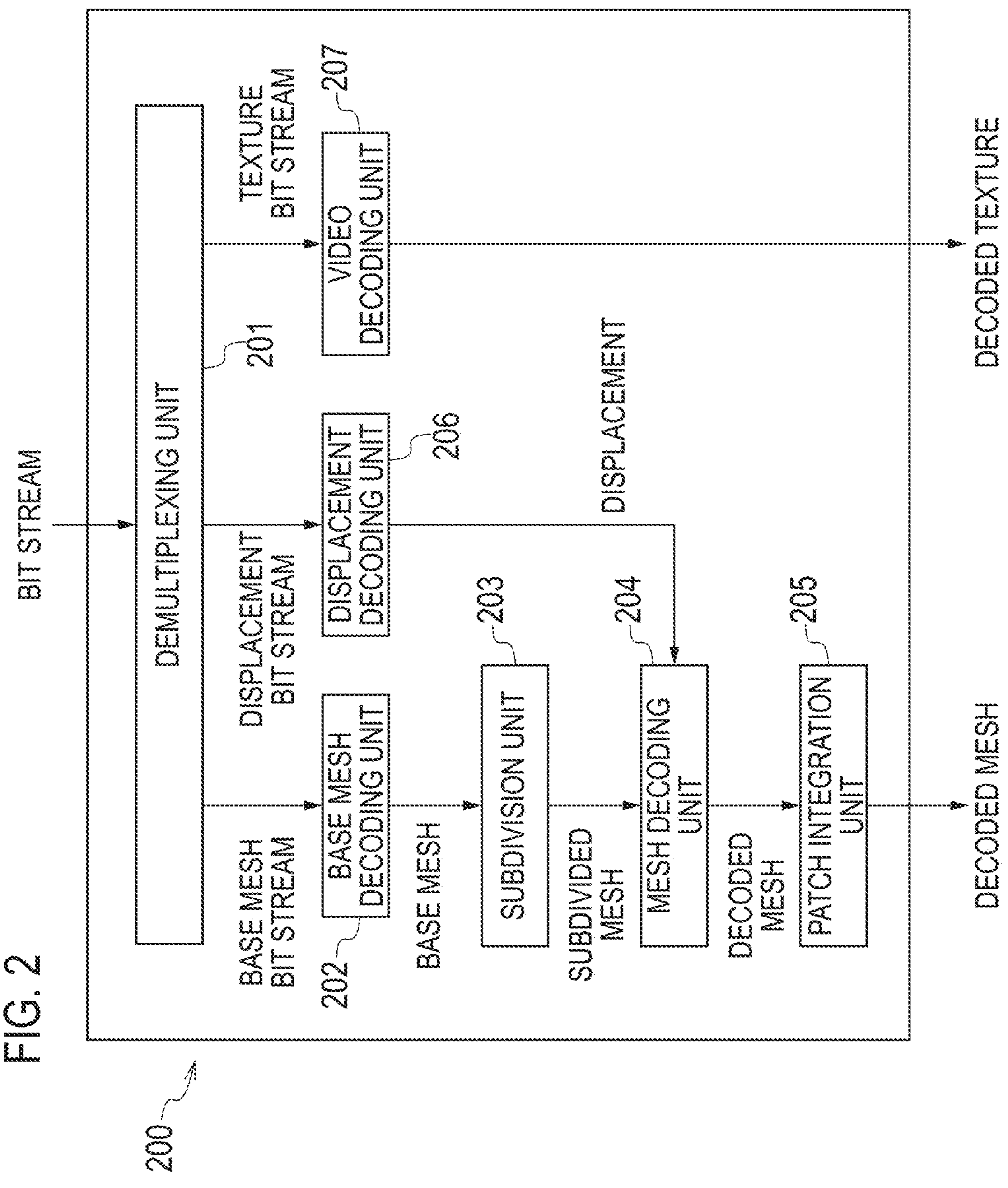
FIG. 2 is a diagram illustrating an example of functional blocks of a mesh decoding device 200 according to an embodiment.

FIG. 2 is a diagram illustrating an example of functional blocks of the mesh decoding device 200 according to the present embodiment.

As illustrated in FIG. 2, the mesh decoding device 200 includes a demultiplexing unit 201, a base mesh decoding unit 202, a subdivision unit 203, a mesh decoding unit 204, a patch integration unit 205, a displacement decoding unit 206, and a video decoding unit 207.

Here, the base mesh decoding unit 202, the subdivision unit 203, the mesh decoding unit 204, and the displacement decoding unit 206 may be configured to perform processing in units of patches obtained by dividing a mesh, and the patch integration unit 205 may be configured to integrate the processing results thereafter.

Figure 3A:
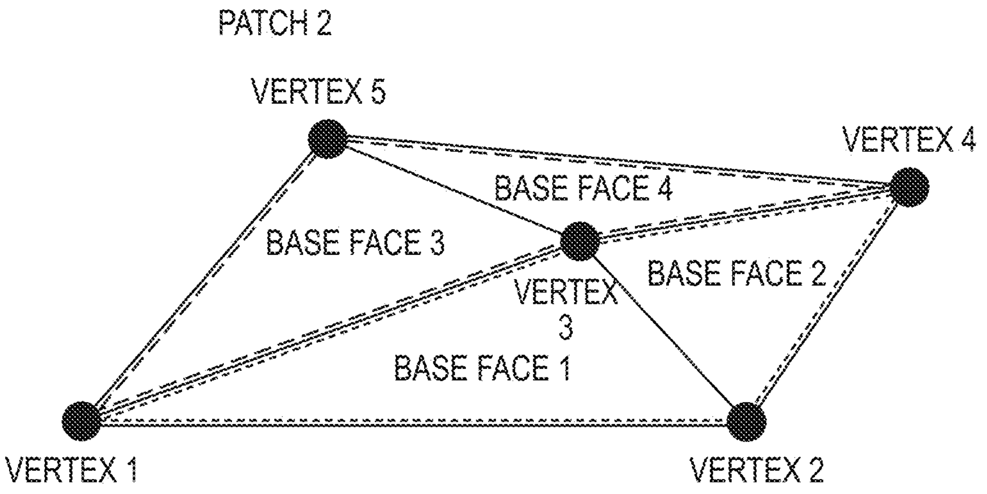
FIG. 3A is a diagram illustrating an example of a base mesh and a subdivided mesh.

In the example of FIG. 3A, the mesh is divided into a patch 1 having base faces 1 and 2 and a patch 2 having base faces 3 and 4.

The demultiplexing unit 201 is configured to separate a multiplexed bit stream into a base mesh bit stream, a displacement bit stream, and a texture bit stream.

<Base Mesh Decoding Unit 202>

The base mesh decoding unit 202 is configured to decode the base mesh bit stream, and generate and output a base mesh.

Here, the base mesh includes a plurality of vertices in a three-dimensional space and edges connecting the plurality of vertices.

As illustrated in FIG. 3A, the base mesh is configured by combining base faces expressed by three vertices.

The base mesh decoding unit 202 may be configured to decode the base mesh bit stream by using, for example, Draco described in Non Patent Literature 2.

Furthermore, the base mesh decoding unit 202 may be configured to generate “subdivision_method_id” described below as control information for controlling a type of a subdivision method.

Hereinafter, the control information decoded by the base mesh decoding unit 202 will be described with reference to FIGS. 4 and 5.

Figure 4:
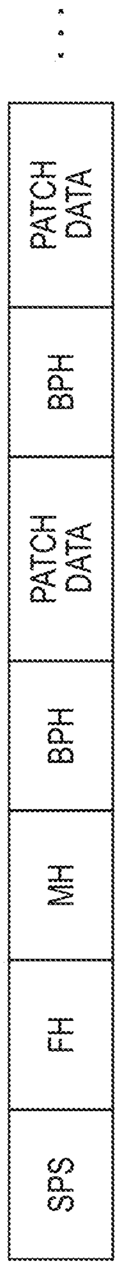
FIG. 4 is a diagram illustrating an example of a syntax configuration of a base mesh bit stream.

FIG. 4 is a diagram illustrating an example of a syntax configuration of the base mesh bit stream.

As illustrated in FIG. 4, firstly, the base mesh bit stream may include a base patch header (BPH) that is a set of control information corresponding to a base mesh patch. Second, the base mesh bit stream may include base mesh patch data obtained by encoding the base mesh patch next to the BPH.

As described above, the base mesh bit stream has a configuration in which the BPH corresponds to each patch data one by one. Note that the configuration of FIG. 4 is merely an example, and elements other than those described above may be added as constituent elements of the base mesh bit stream as long as the BPH corresponds to each patch data.

For example, as illustrated in FIG. 4, the base mesh bit stream may include a sequence parameter set (SPS), may include a frame header (FH) which is a set of control information corresponding to a frame, or may include a mesh header (MH) which is control information corresponding to the mesh.

FIG. 5 is a diagram illustrating an example of a syntax configuration of the BPH. Here, if syntax functions are similar, syntax names different from those illustrated in FIG. 5 may be used.

In the syntax configuration of the BPH illustrated in FIG. 5, a Descriptor column indicates how each syntax is encoded. Further, ue(v) means an unsigned 0-order exponential-Golomb code, and u(n) means an n-bit flag.

The BPH includes at least a control signal (mdu_face_count_minus1) that designates the number of base faces included in the base mesh patch.

Further, the BPH includes at least a control signal (mdu_subdivision_method_id) that designates the type of the subdivision method of the base mesh for each base patch.

In addition, the BPH may include a control signal (mdu_subdivision_num_method_id) that designates a type of a subdivision number generation method for each base mesh patch.

For example, when mdu_subdivision_num_method_id=0, it may be defined that the number of subdivisions of the base face is generated by a prediction division residual, when mdu_subdivision_num_method_id=1, it may be defined that the number of subdivisions of the base face is recursively generated, and when mdu_subdivision_num_method_id=2, it may be defined that the same upper limit number of times of subdivision is recursively performed for all the base faces.

The BPH may include a control signal (mdu_subdivision_residuals) that designates the prediction division residual of the base face for each index i (i=0, . . . , and mdu_face_count_minus1) when the number of subdivisions of the base face is generated by the prediction division residual.

The BPH may include a control signal (mdu_max_depth) for identifying an upper limit of the number of times of subdivision recursively performed for each base mesh patch when the number of subdivisions of the base face is recursively generated.

The BPH may include a control signal (mdu_subdivision_flag) that designates whether or not to recursively subdivide the base face for each of the indices i (i=0, . . . , and mdu_face_count_minus1) and j (j=0, . . . , and mdu_subdivision_depth_index).

The BPH may include a control signal (mdu_division_num) that designates the number of divisions per subdivision.

Figure 6:
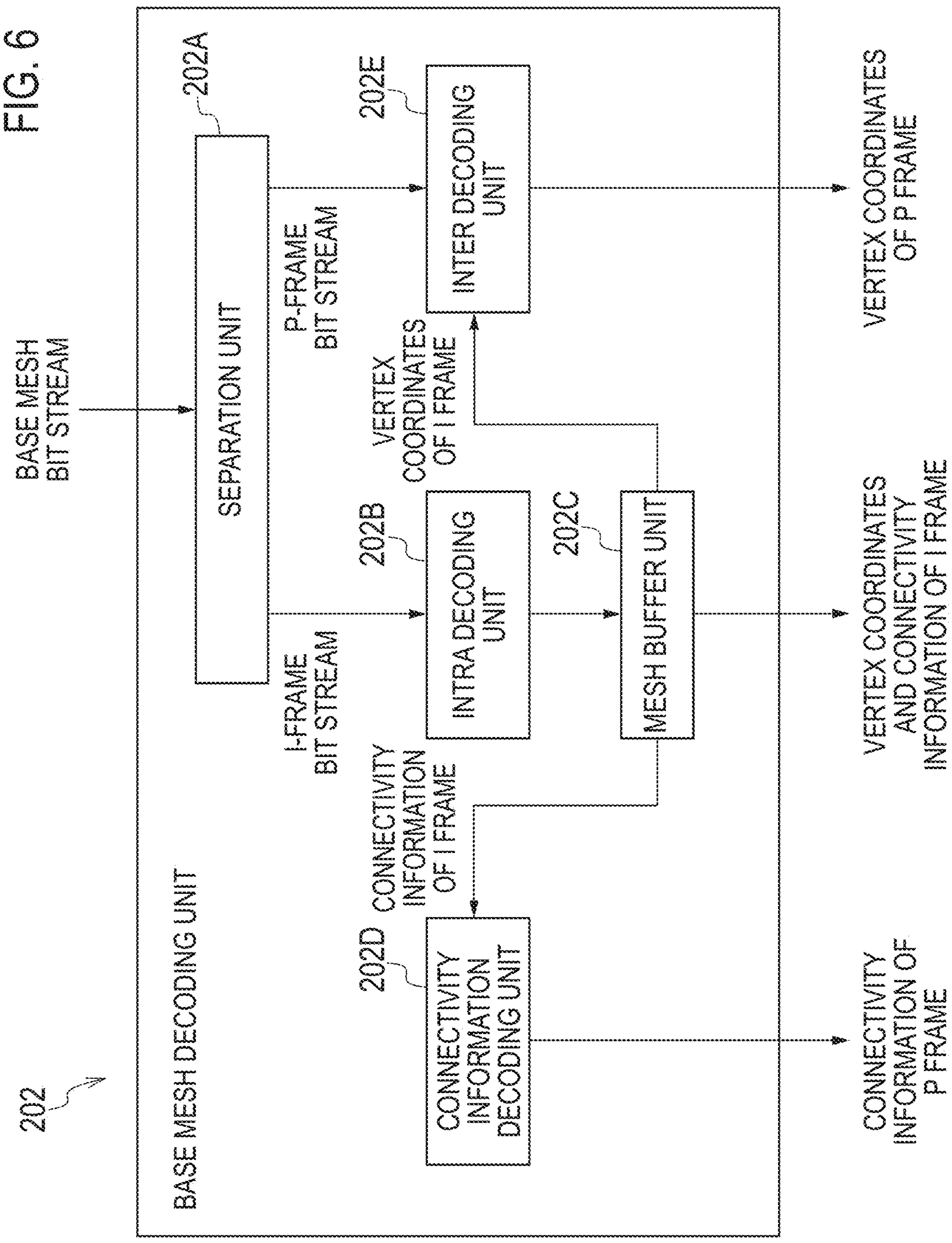
FIG. 6 is a diagram illustrating an example of functional blocks of a base mesh decoding unit 202 of the mesh decoding device 200 according to an embodiment.

As illustrated in FIG. 6, the base mesh decoding unit 202 includes a separation unit 202A, an intra decoding unit 202B, a mesh buffer unit 202C, a connectivity information decoding unit 202D, and an inter decoding unit 202E.

The separation unit 202A is configured to classify the base mesh bit stream into an I-frame (reference frame) bit stream and a P-frame bit stream.

(Intra Decoding Unit 202B)

The intra decoding unit 202B is configured to decode coordinates and connectivity information of vertices of an I frame from the I-frame bit stream using, for example, Draco described in Non Patent Literature 2.

Figure 7:
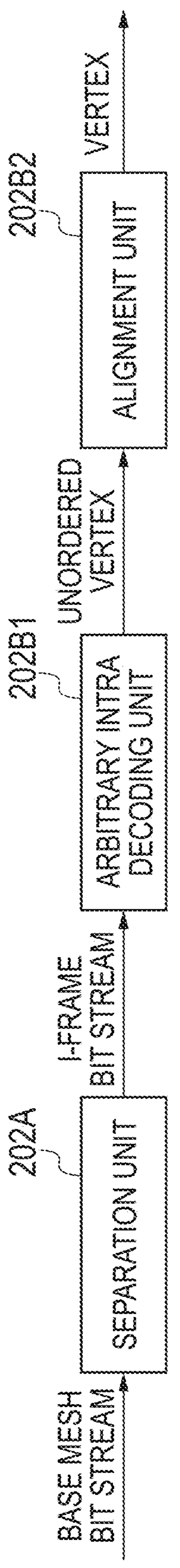
FIG. 7 is a diagram illustrating an example of functional blocks of an intra decoding unit 202B of the base mesh decoding unit 202 of the mesh decoding device 200 according to an embodiment.

FIG. 7 is a diagram illustrating an example of functional blocks of the intra decoding unit 202B.

As illustrated in FIG. 7, the intra decoding unit 202B includes a separation unit 202A, an arbitrary intra decoding unit 202B1, and an alignment unit 202B2.

The arbitrary intra decoding unit 202B1 is configured to decode coordinates and connectivity information of unordered vertices of the I frame from the I-frame bit stream using an arbitrary method including Draco described in Non Patent Literature 2.

The alignment unit 202B2 is configured to output the vertices by rearranging the unordered vertices in a predetermined order.

As the predetermined order, for example, a Morton code order may be used, or a raster scan order may be used.

In addition, a plurality of vertices having the same coordinates, that is, duplicate vertices, may be collectively rearranged in the predetermined order as a single vertex.

The mesh buffer unit 202C is configured to accumulate the coordinates and the connectivity information of the vertices of the I frame decoded by the intra decoding unit 202B.

The connectivity information decoding unit 202D is configured to set the connectivity information of the I frame extracted from the mesh buffer unit 2020 as connectivity information of a P frame.

The inter decoding unit 202E is configured to decode coordinates of a vertex of the P frame by adding the coordinates of the vertex of the I frame extracted from the mesh buffer unit 202C and a motion vector decoded from the P-frame bit stream.

Figure 8:
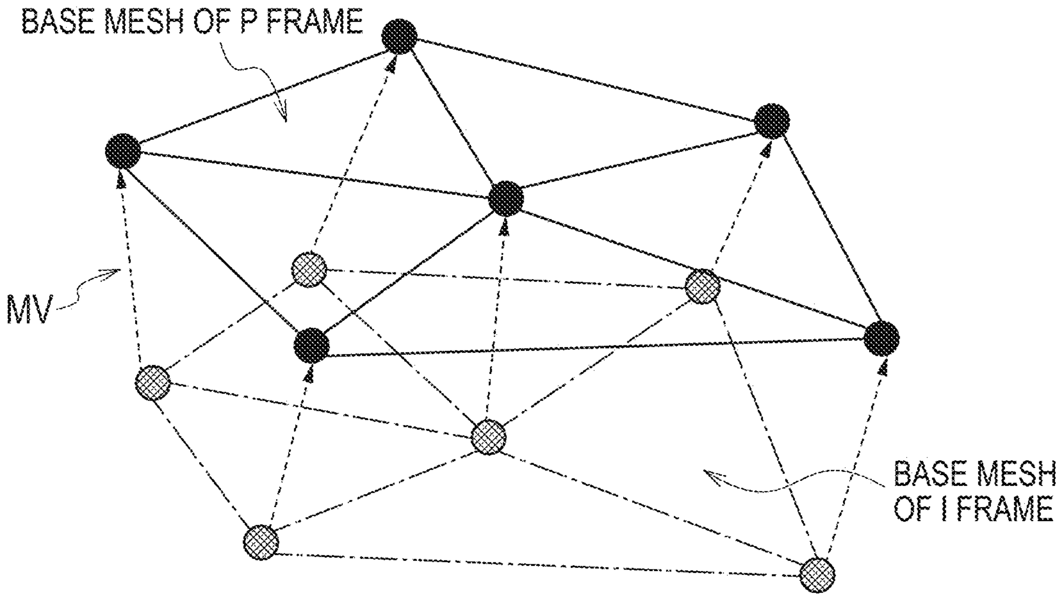
FIG. 8 is a diagram illustrating an example of a correspondence between vertices of a base mesh of a P frame and vertices of a base mesh of an I frame.

In the present embodiment, as illustrated in FIG. 8, there is a correspondence between the vertex of the base mesh of the P frame and the vertex of the base mesh of the I frame (reference frame). Here, the motion vector decoded by the inter decoding unit 202E is a difference vector between the coordinates of the vertex of the base mesh of the P frame and the coordinates of the vertex of the base mesh of the I frame.

(Inter Decoding Unit 202E)

Figure 9:
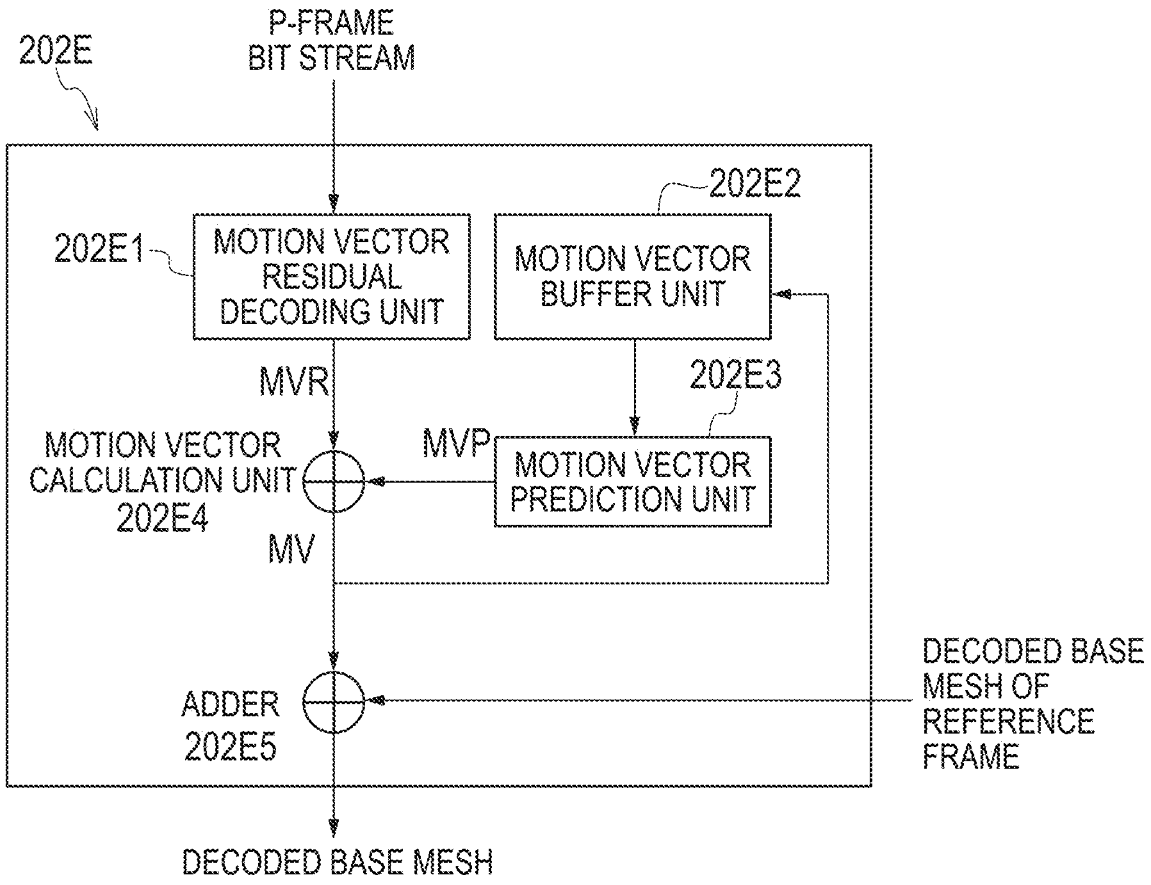
FIG. 9 is a diagram illustrating an example of functional blocks of an inter decoding unit 202E of the base mesh decoding unit 202 of the mesh decoding device 200 according to an embodiment.

FIG. 9 is a diagram illustrating an example of functional blocks of the inter decoding unit 202E.

As illustrated in FIG. 9, the inter decoding unit 202E includes a motion vector residual decoding unit 202E1, a motion vector buffer unit 202E2, a motion vector prediction unit 202E3, a motion vector calculation unit 202E4, and an adder 202E5.

The motion vector residual decoding unit 202E1 is configured to generate a motion vector residual (MVR) from the P-frame bit stream.

Here, the MVR is a motion vector residual indicating a difference between the motion vector (MV) and a motion vector prediction (MVP). The MV is a difference vector (motion vector) between the coordinates of the corresponding vertex of the I frame and the coordinates of the vertex of the P frame. The MVP is a predicted value of the MV of a target vertex using the MV (a predicted value of the motion vector).

The motion vector buffer unit 202E2 is configured to sequentially store the MVs output by the motion vector calculation unit 202E4.

Figure 10:
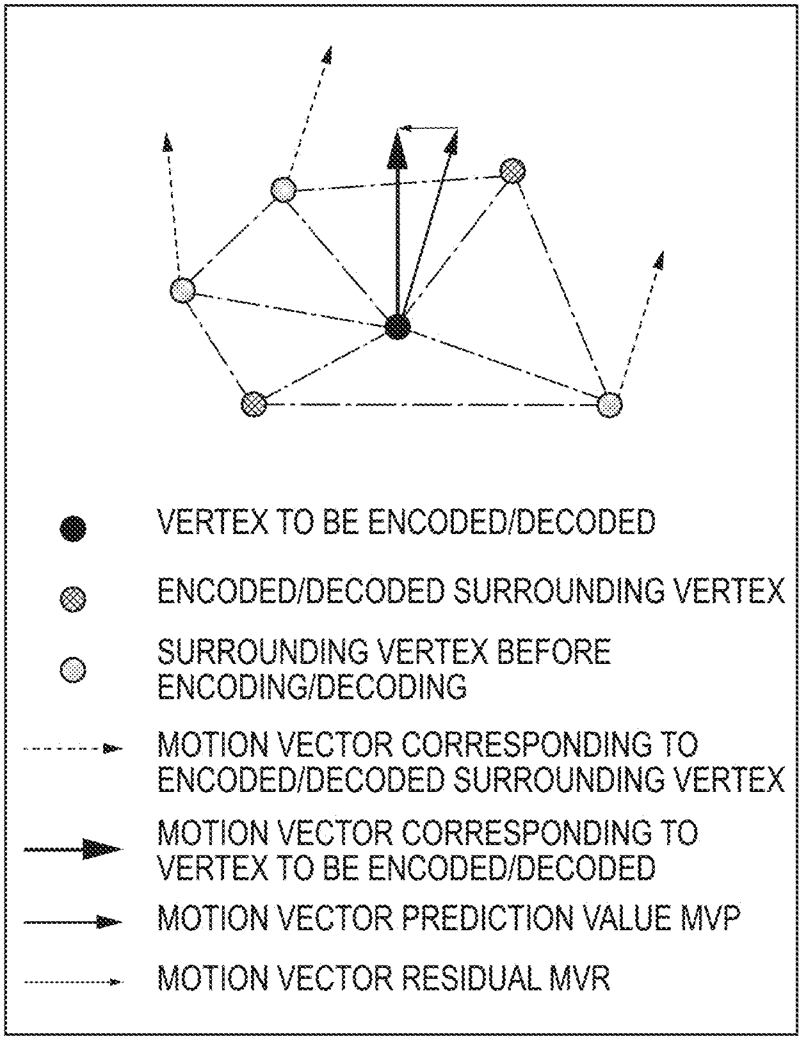
FIG. 10 is a diagram for explaining an example of a method of calculating a motion vector prediction (MVP) of a vertex to be decoded by a motion vector prediction unit 202E3 of the inter decoding unit 202E of the base mesh decoding unit 202 of the mesh decoding device 200 according to an embodiment.

The motion vector prediction unit 202E3 is configured to acquire the decoded MV from the motion vector buffer unit 202E2 for a vertex connected to a vertex to be decoded, and output the MVP of the vertex to be decoded using all or some of the acquired decoded MVs as illustrated in FIG. 10.

The motion vector calculation unit 202E4 is configured to add the MVR generated by the motion vector residual decoding unit 202E1 and the MVP output from the motion vector prediction unit 202E3, and output the MV of the vertex to be decoded.

The adder 202E5 is configured to add coordinates of a vertex corresponding to the vertex to be decoded obtained from the decoded base mesh of the I frame (reference frame) having the correspondence and the motion vector MV output from the motion vector calculation unit 202E3, and output the coordinates of the vertex to be decoded.

Details of each unit of the inter decoding unit 202E will be described below.

Figure 11:
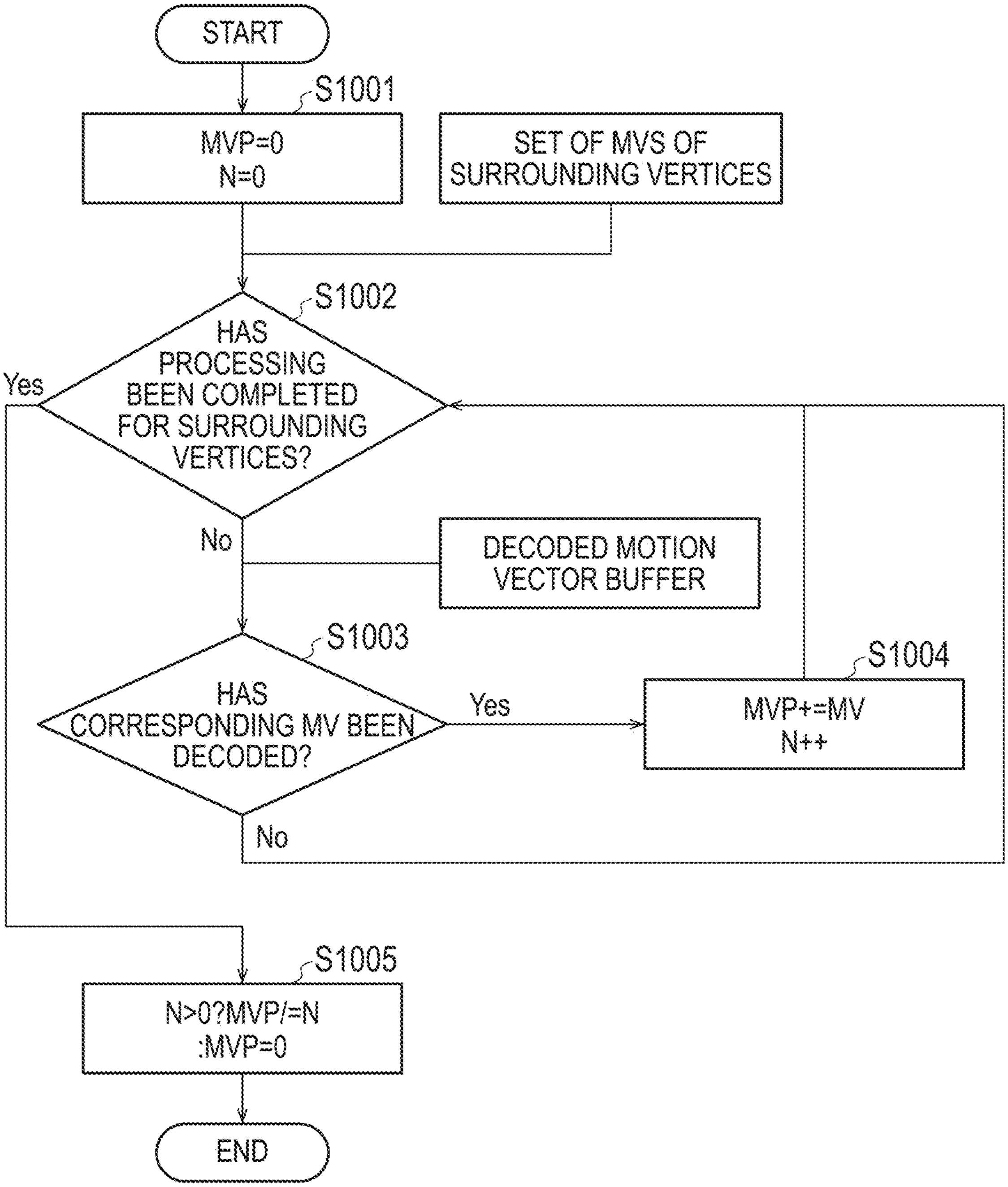
FIG. 11 is a flowchart illustrating an example of an operation of the motion vector prediction unit 202E3 of the inter decoding unit 202E of the base mesh decoding unit 202 of the mesh decoding device 200 according to an embodiment.

FIG. 11 is a flowchart illustrating an example of an operation of the motion vector prediction unit 202E3.

As illustrated in FIG. 11, in step S1001, the motion vector prediction unit 202E3 sets the MVP and N to 0.

In step S1002, the motion vector prediction unit 202E3 acquires a set of MVs of vertices around the vertex to be decoded from the motion vector buffer unit 202E2, specifies a vertex for which subsequent processing has not been completed, and transitions to No. In a case where the subsequent processing has been completed for all the vertices, the motion vector prediction unit 202E3 transitions to Yes.

In step S1003, the motion vector prediction unit 202E3 transitions to No if the MV of the vertex to be processed has not been decoded, and transitions to Yes if the MV of the vertex to be processed has been decoded.

In step S1004, the motion vector prediction unit 202E3 adds the MV to the MVP and adds 1 to N.

In step S1005, the motion vector prediction unit 202E3 outputs a result obtained by dividing the MVP by N if N is larger than 0, outputs 0 if N is 0, and ends the processing.

That is, the motion vector prediction unit 202E3 is configured to output an MVP to be decoded by averaging the decoded motion vectors of the vertices around the vertex to be decoded.

Note that the motion vector prediction unit 202E3 may be configured to set the MVP to 0 in a case where a set of decoded motion vectors is an empty set.

The motion vector calculation unit 202E4 may be configured to calculate the MV of the vertex to be decoded from the MVP output by the motion vector prediction unit 202E3 and the MVR generated by the motion vector residual decoding unit 202E1 according to Expression (1).

$$MV(k) = MVP(k) + MVR(k) \tag{1}$$

Here, k is an index of a vertex. MV, MVR, and MVP are vectors having an x component, a y component, and a z component.

According to such a configuration, since only the MVR is encoded instead of the MV by using the MVP, it is possible to expect an effect of increasing encoding efficiency.

The adder 202E5 is configured to calculate the coordinates of the vertex by adding the MV of the vertex calculated by the motion vector calculation unit 202E4 and the coordinates of the vertex of the reference frame that corresponds to the vertex, and keep the connectivity information (connectivity) as that of the reference frame.

Specifically, the adder 202E5 may be configured to calculate a coordinate $v'_i(k)$ of the k-th vertex using Expression (2).

$$v'_i(k) = v'_j(k) + MV(k) \tag{2}$$

Here, $v'_i(k)$ is the coordinate of the k-th vertex to be decoded in a frame to be decoded, $v'_j(k)$ is a coordinate of a decoded k-th vertex of the reference frame, MV(k) is a k-th MV of the frame to be decoded, and k=1, 2 . . . , and K.

Further, connectivity information of the frame to be decoded is made the same as the connectivity information of the reference frame.

Note that, since the motion vector prediction unit 202E3 calculates the MVP using the decoded MV, a decoding order affects the MVP.

The decoding order is the decoding order of the vertices of the base mesh of the reference frame. In general, in the case of a decoding method in which the number of base faces is increased one by one from an edge serving as a starting point using a constant repetition pattern, an order of the decoded vertices of the base mesh is determined in a process of decoding.

For example, the motion vector prediction unit 202E3 may determine the decoding order of the vertices using Edgebreaker in the base mesh of the reference frame.

According to such a configuration, since the MV from the reference frame is encoded instead of the coordinates of the vertex, it is possible to expect an effect of increasing the encoding efficiency.

First Modified Example of Inter Decoding Unit 202E

The MVP calculated in the flowchart illustrated in FIG. 11 is calculated by a simple average of the decoded surrounding MVs, and may be calculated by a weighted average.

That is, the motion vector prediction unit 202E3 may be configured to output the predicted value of the motion vector to be decoded by performing weighted averaging on the decoded motion vector of the vertex around the vertex to be decoded with a weight corresponding to a distance between the vertex to be decoded and the vertex of the reference frame corresponding to the vertex around the vertex to be decoded.

Further, the motion vector prediction unit 202E3 may be configured to output the predicted value of the motion vector to be decoded by performing weighted averaging on a part of the decoded motion vector of the vertex around the vertex to be decoded with the weight corresponding to the distance between the vertex to be decoded and the vertex of the reference frame corresponding to the vertex around the vertex to be decoded.

In the first modified example, the motion vector prediction unit 202E3 of the inter decoding unit 202E is configured to calculate the MVP by the following procedure.

First, the motion vector prediction unit 202E3 is configured to calculate the weight.

Figure 12:
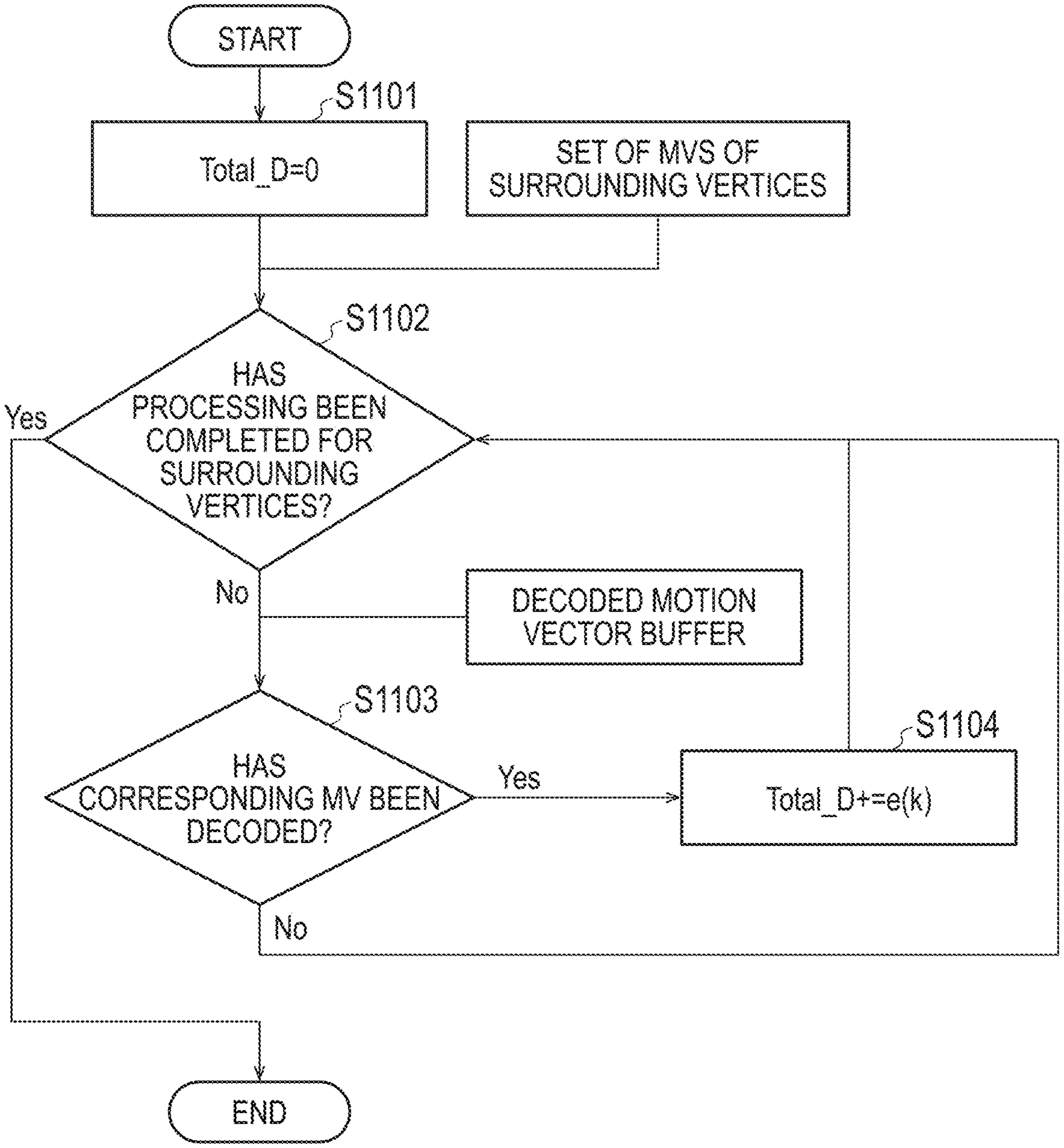
FIG. 12 is a flowchart illustrating an example of an operation in which the motion vector prediction unit 202E3 of the inter decoding unit 202E of the base mesh decoding unit 202 of the mesh decoding device 200 according to an embodiment calculates a sum Total_D of distances to decoded surrounding vertices.

FIG. 12 is a flowchart illustrating an example of an operation of calculating a sum Total_D of distances to decoded surrounding vertices.

As illustrated in FIG. 12, in step S1101, the motion vector prediction unit 202E3 sets Total_D to 0.

Step S1102 is the same as step S1002.

Step S1103 is the same as step S1003.

In step S1104, the motion vector prediction unit 202E3 adds e(k) to Total_D.

That is, the motion vector prediction unit 202E3 adds distances to decoded vertices by referring to a set of vertices around the vertex to be decoded.

In the first modified example, the motion vector prediction unit 202E3 is configured to calculate the weight by using the distance in the reference frame in which the correspondence between the vertices is known.

That is, e(k) in step S1104 of FIG. 12 is a distance between corresponding vertices in the reference frame.

Then, the motion vector prediction unit 202E3 may be configured to calculate a weight w(k) by Expressions (3) and (4).

[Math. 1]

$$d(k) = \frac{\text{Total\_D}}{e(k)} \tag{3}$$

-continued $$w(k) = \frac{d(k)}{\sum_{p\in\theta} d(p)} \tag{4}$$

Here, Θ is a set of respective decoded vertices on a face of the mesh including the vertex to be decoded, e(p/k) is a distance between the vertex to be decoded and a vertex corresponding to a vertex p/k in the reference frame, and w(k) is the weight at a vertex k.

The motion vector prediction unit 202E3 may be configured to set the weight according to a rule determined in advance according to the distance.

For example, the motion vector prediction unit 202E3 may be configured to set the weight to 1 in a case where e(k) is smaller than a threshold TH1, set the weight to 0.5 in a case where e(k) is smaller than a threshold TH2, and set the weight to 0 (the weight is not used) in other cases.

According to such a configuration, it is possible to expect an effect that the MVP can be calculated with higher accuracy by increasing the weight in a case where the distance to the vertex to be decoded is short.

Secondly, the motion vector prediction unit 202E3 is configured to refer to the MVP.

Figure 13:
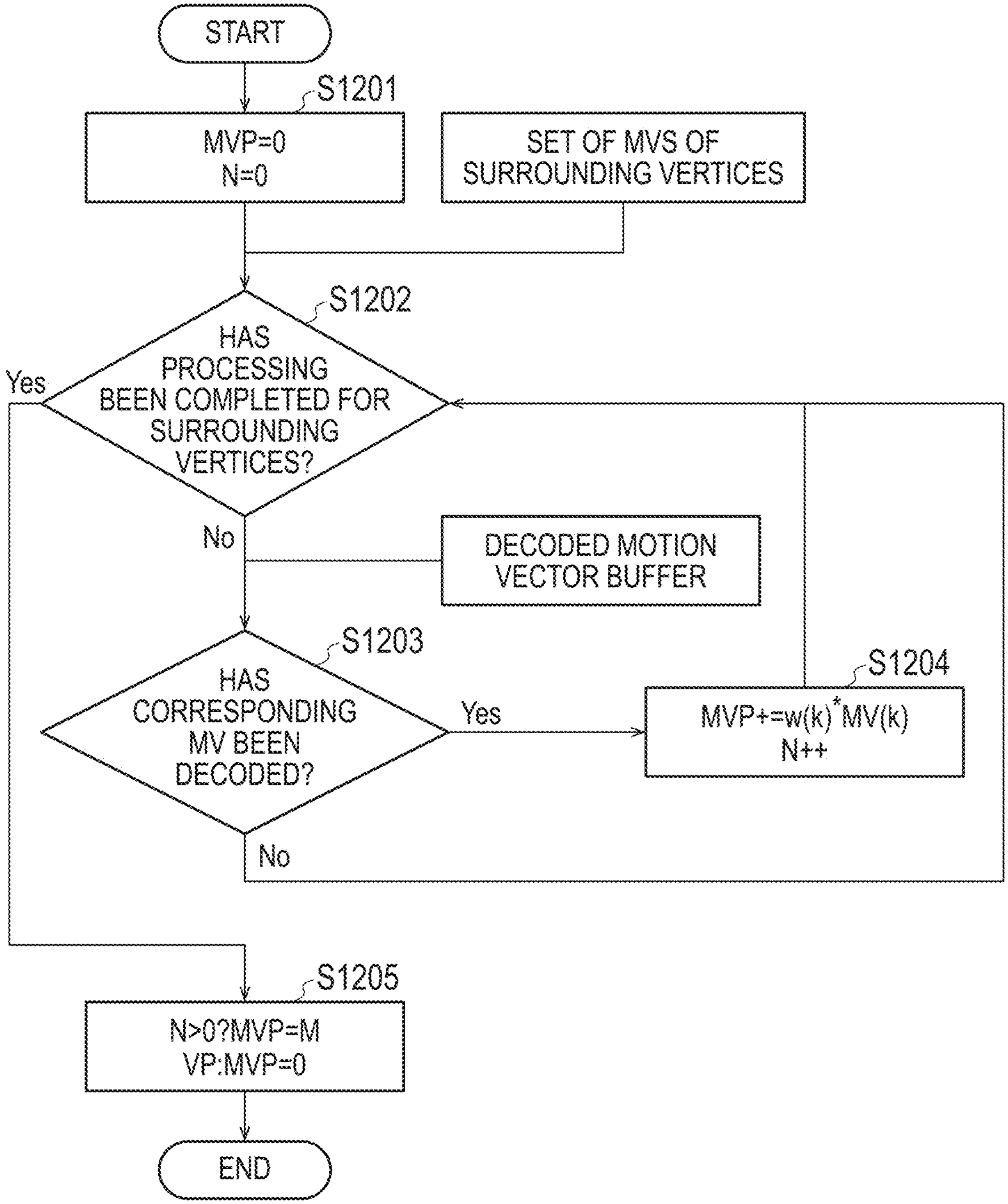
FIG. 13 is a flowchart illustrating an example of an operation in which the motion vector prediction unit 202E3 of the inter decoding unit 202E of the base mesh decoding unit 202 of the mesh decoding device 200 according to an embodiment calculates the MVP using a weighted average.

FIG. 13 is a flowchart illustrating an example of an operation of calculating the MVP using the weighted average.

As illustrated in FIG. 13, in step S1201, the motion vector prediction unit 202E3 sets the MVP and N to 0.

Step S1202 is the same as step S1002.

Step S1203 is the same as step S1003.

In step S1204, the motion vector prediction unit 202E3 adds w(k)×MV(k) to the MVP and adds 1 to N.

Step S1205 is the same as step S1005.

Alternatively, the motion vector prediction unit 202E3 may be configured to calculate the MVP by Expression (5).

[Math. 2]

$$MVP(k) = \sum_{m\in\theta} w(m)\cdot MV(m) \tag{5}$$

Here, Θ is a set of respective decoded vertices on a face of the mesh including the vertex to be decoded.

According to such a configuration, since the MVP with higher accuracy can be calculated by the weighted average, it is possible to expect an effect of increasing the encoding efficiency by decreasing a value of the MVR and concentrating the MVR near zero.

Second Modified Example of Inter Decoding Unit 202E

In a second modified example, the motion vector prediction unit 202E3 is configured to select one MV instead of calculating the MVP using a plurality of surrounding MVs.

That is, the motion vector prediction unit 202E3 may be configured to select the MV of the closest vertex among the decoded MVs accumulated in the motion vector buffer unit 202E2 as an MV of a vertex connected to the vertex to be decoded.

Here, the motion vector prediction unit 202E3 may be configured to construct a candidate list including MVs of vertices connected to the vertex to be decoded from among the decoded MVs accumulated in the motion vector buffer unit 202E2, and select a motion vector from the candidate list based on an index decoded from the bit stream of the P frame (the frame to be decoded).

Figure 14:
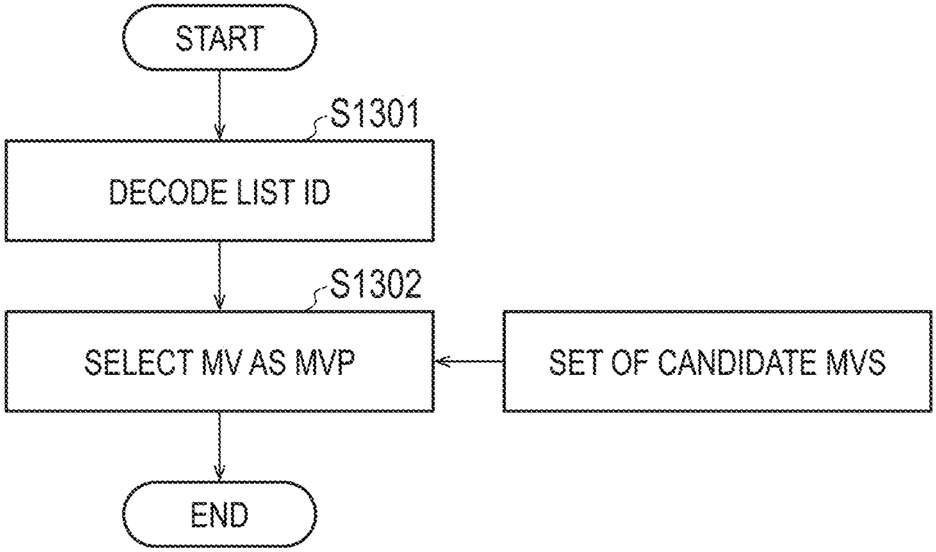
FIG. 14 is a flowchart illustrating an example of an operation in which the motion vector prediction unit 202E3 of the inter decoding unit 202E of the base mesh decoding unit 202 of the mesh decoding device 200 according to an embodiment selects a motion vector (MV) as the MVP from a set of candidate MVs.

FIG. 14 is a flowchart illustrating an example of an operation of selecting an MV from a set of candidate MVs as the MVP.

As illustrated in FIG. 14, in step S1301, the motion vector prediction unit 202E3 decodes a list ID from the P-frame bit stream.

In step S1302, the motion vector prediction unit 202E3 selects an MV to which the list ID is to be assigned as the MVP from among the candidate MVs.

Note that, in the set of candidate MVs in FIG. 14, the decoded surrounding MVs and the MVs calculated by the combination are arranged in a certain order.

Figure 15:
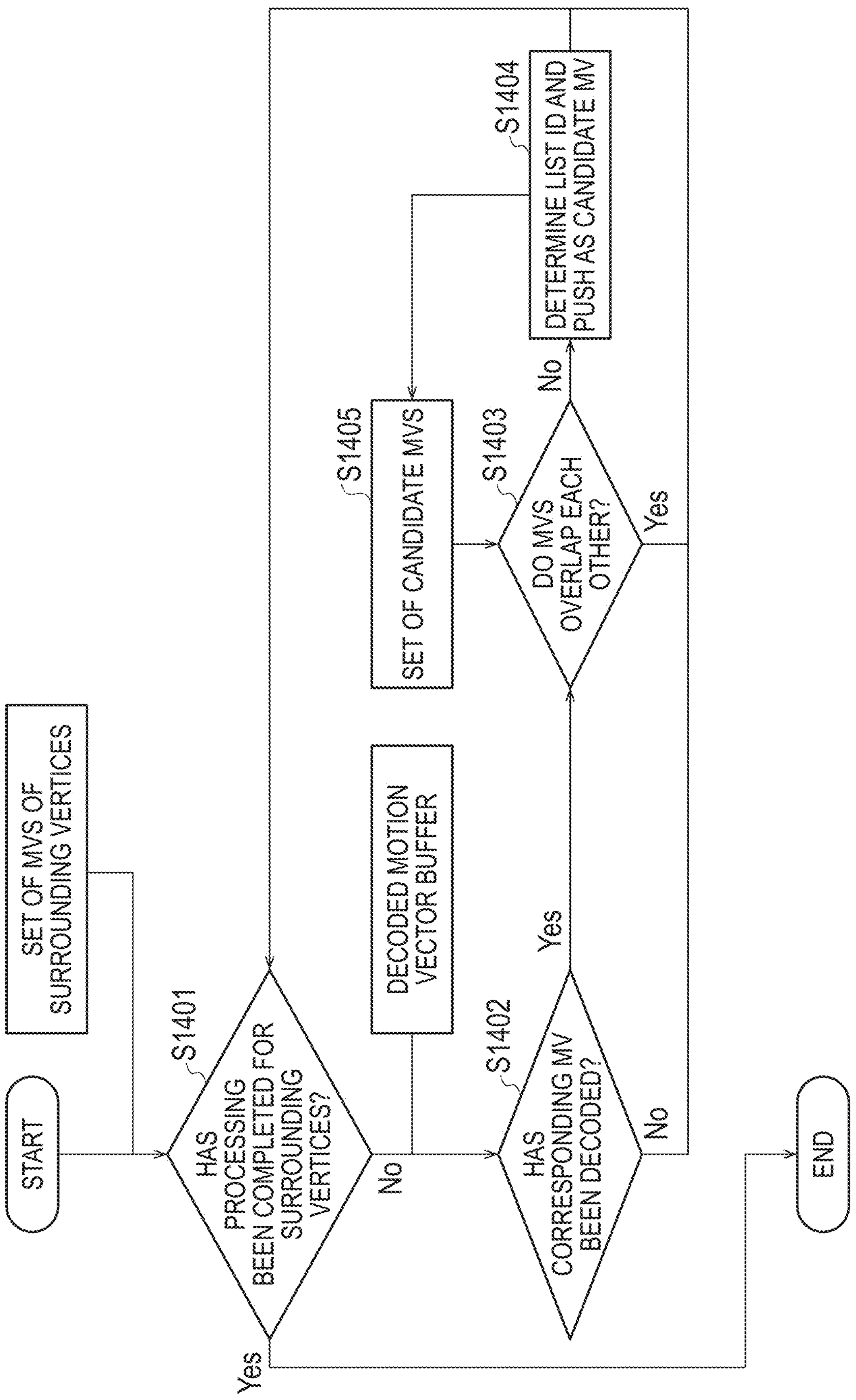
FIG. 15 is a flowchart illustrating an example of an operation in which the motion vector prediction unit 202E3 of the inter decoding unit 202E of the base mesh decoding unit 202 of the mesh decoding device 200 according to an embodiment creates the set of candidate MVs.

FIG. 15 is a flowchart illustrating an example of an operation of creating the set of candidate MVs.

As illustrated in FIG. 15, in step S1401, the motion vector prediction unit 202E3 determines whether or not processing for all the vertices around the vertex to be decoded has been completed by referring to the set of MVs of the vertices around the vertex to be decoded.

In a case where such processing has been completed, the operation ends, and in a case where such processing has not been completed, the operation proceeds to step S1402.

In step S1402, the motion vector prediction unit 202E3 determines whether or not the MV of the target vertex has been decoded.

In a case where the MV has been decoded, the operation proceeds to step S1403, and in a case where the MV has not been decoded, the operation returns to step S1401.

In step S1403, the motion vector prediction unit 202E3 determines whether or not the MV overlaps with another decoded MV.

In a case where the MVs overlap each other, the operation returns to step S1401, and in a case where the MVs do not overlap each other, the operation proceeds to step S1404.

In step S1404, the motion vector prediction unit 202E3 determines the list ID to be assigned to the MV, and in step S1405, the motion vector prediction unit 202E3 includes the list ID in the set of candidate MVs.

In FIG. 15, when determining the list ID, the motion vector prediction unit 202E3 may sequentially increase the list ID by one, or may determine the list ID in an order of the distance (e(k) in Expression (3)) between the vertex to be decoded and a vertex corresponding to the vertex k in the reference frame.

According to such a configuration, since one MV selected as the MVP from among the candidate MVs may be closer to the MV than the average in some cases, in this case, it is possible to expect an effect of increasing the encoding efficiency.

Furthermore, the motion vector prediction unit 202E3 may be configured to add an MV obtained by averaging consecutive MV0 and MV1 among the candidate MVs described above to the list as a new candidate MV. The motion vector prediction unit 202E3 adds the MV after MV0 and MV1 as illustrated in Table 1.

TABLE 1

| No (index) | Candidate MV |
|---|---|
| 0 | MV0 |
| 1 | MV1 |
| 2 | (MV0 + MV1)/2 |

TABLE 1-continued

| No (index) | Candidate MV |
|---|---|
| 3 | MV2 |
| 4 | MV3 |

According to such a configuration, it is possible to expect an effect of increasing a possibility that the selected candidate MV is closer to the MV of the vertex to be decoded.

Furthermore, the motion vector prediction unit 202E3 may be configured to select the MV of the closest vertex from the set of candidate MVs without encoding the list ID. According to such a configuration, it is possible to expect an effect of further increasing the encoding efficiency.

Third Modified Example of Inter Decoding Unit 202E

In the above-described embodiment and first and second modified examples, the surrounding vertices are vertices connected to the vertex to be decoded.

On the other hand, in a third modified example, the motion vector prediction unit 202E3 is configured to calculate the MVP by parallelogram prediction, that is, by also using a vertex that is not directly connected to the vertex to be decoded.

As illustrated in FIG. 16, in the parallelogram prediction, a vertex D on the opposite side of a decoded face having a shared edge BC with a vertex A to be decoded is also used.

Furthermore, the shared edge of the vertex A to be decoded includes CE and BG in addition to AB. Therefore, vertices F and H can likewise be used in the parallelogram prediction.

For example, the motion vector prediction unit 202E3 may be configured to calculate the MVP by Expression (6) using a face BCD illustrated in FIG. 16.

$$MVP = MV(B) + MV(C) - MV(D) \tag{6}$$

Here, MV(X) is a motion vector of a vertex X, and MVP is a motion vector prediction value of the vertex A to be decoded.

In addition, when there are a plurality of shared edges described above, the motion vector prediction unit 202E3 may average the respective MVPs, or may select a face having the closest center of gravity.

Fourth Modified Example of Inter Decoding Unit 202E

In the present modified example, the MVR generated by the motion vector residual decoding unit 202E1 is not maintained as it is, and a quantized width when the MVR is expressed as an integer is controlled.

In the present modified example, the motion vector residual decoding unit 202E1 is configured to decode adaptive_mesh_flag, adaptive_bit_flag, and an accuracy control parameter as control information for controlling the quantized width of the MVR.

That is, the motion vector residual decoding unit 202E1 is configured to decode adaptive_mesh_flag of the entire base mesh and adaptive_bit_flag for each base patch.

Here, adaptive_mesh_flag and adaptive_bit_flag are flags indicating whether or not to adjust the quantized width of the MVR described above, and take either a value of 0 or 1.

Here, the motion vector residual decoding unit 202E1 decodes adaptive_bit_flag only in a case where adaptive_mesh_flag is valid (that is, 1).

Furthermore, in a case where adaptive_mesh_flag is invalid (that is, 0), the motion vector residual decoding unit 202E1 considers that adaptive_bit_flag is invalid (that is, 0).

FIG. 17 is a flowchart illustrating an example of an operation of controlling the quantized width of the decoded MVR from adaptive_mesh_flag, adaptive_bit_flag, and the accuracy control parameter which are the control information generated by decoding the base mesh bit stream.

As illustrated in FIG. 17, in step S1601, the motion vector prediction unit 202E3 determines whether or not adaptive_mesh_flag is 0.

In a case where the motion vector prediction unit 202E3 determines that adaptive_mesh_flag of the entire mesh is 0, the operation ends.

On the other hand, in a case where the motion vector prediction unit 202E3 determines that adaptive_mesh_flag of the entire mesh is 1, the operation proceeds to step S1602.

In step S1602, the motion vector prediction unit 202E3 determines whether or not there is an unprocessed patch in the frame.

In step S1603, the motion vector prediction unit 202E3 determines whether or not adaptive_mesh_flag decoded for each patch is 0.

In a case where the motion vector prediction unit 202E3 determines that adaptive_mesh_flag is 0, the operation returns to step S1601.

On the other hand, in a case where the motion vector prediction unit 202E3 determines that adaptive_mesh_flag is 1, the operation proceeds to step S1604.

In step S1604, the motion vector prediction unit 202E3 controls the quantized width of the MVR based on the accuracy control parameter described below.

Note that a value of the MVR of which the quantized width is controlled in this manner is referred to as “motion vector residual quantization (MVRQ)”.

Here, the motion vector prediction unit 202E3 may be configured to use the quantized width of the MVR corresponding to a quantized width control parameter generated by decoding the base mesh bit stream with reference to, for example, a table as shown in Table 2.

TABLE 2

| Quantized width control parameter | Quantized width of MVR |
|---|---|
| 1 | Two times |
| 2 | Four times |
| 3 | Eight times |

According to such a configuration, it is possible to expect an effect of increasing the encoding efficiency by controlling the quantized width of the MVR. Furthermore, by a hierarchical mechanism of the mesh-level adaptive_mesh_flag and the patch-level adaptive_mesh_flag, it is possible to expect an effect that useless bits can be minimized when the quantized width of the MVR is not controlled.

Fifth Modified Example of Inter Decoding Unit 202E

In a case where the MVR generated by the motion vector residual decoding unit 202E1 is not encoded, an error occurs. In a fifth modified example, a discrete motion vector difference is encoded in order to correct such an error.

Specifically, as illustrated in FIG. 18, the MVR can take sizes of 1, 2, 4, and 8 in six directions along an x axis, a y axis, and a z axis. An example of such encoding is shown in Tables 3 and 4.

Furthermore, MVR encoding may be performed in combination of a plurality of directions. For example, correction may be performed in an order of 2 in a + direction of the x axis and 1 in a + direction of the y axis.

TABLE 3

| | | | | | | |
|---|---|---|---|---|---|---|
| direction_idx | 000 | 001 | 010 | 011 | 100 | 101 |

TABLE 4

| distance_idx | 0 | 1 | 2 | 3 |
|---|---|---|---|---|
| value | 1 | 2 | 4 | 8 |

According to such a configuration, it is possible to expect an effect that the encoding efficiency of the discrete motion vector difference is higher than that of the MVR encoding.

A further modified example of the inter decoding unit 202E will be described below.

In the further modified example of the above-described inter decoding unit 202E, the following functional blocks are added before the above-described inter decoding unit 202E is implemented.

Specifically, as illustrated in FIG. 19, the inter decoding unit 202E includes a duplicate vertex search unit 202E6, a duplicate vertex determination unit 202E7, a motion vector acquisition unit 202E8, an All skip mode signal determination unit 202E9, and a Skip mode signal determination unit 202E10, in addition to the configuration illustrated in FIG. 9.

The All skip mode signal determination unit 202E9 is configured to determine whether an All skip mode signal indicates Yes or No, and the Skip mode signal determination unit 202E10 is configured to determine whether a skip mode signal indicates Yes or No.

Here, the All skip mode signal is at the beginning of the P-frame bit stream, has at least two values, and is one bit or one or more bits.

One case (a case where the All skip mode signal indicates Yes, for example, has a value of 1) is a signal for copying a motion vector of a duplicate vertex without decoding the motion vectors of all the duplicate vertices of the P frame from the bit stream.

The other case (a case where the All skip mode signal indicates No, for example, has a value of 0) is a signal for performing different processing for each vertex of the P frame. Furthermore, the other case may have other values. For example, the other case is a signal for performing processing similar to that of the inter decoding unit 202E illustrated in FIG. 9 without performing processing in the motion vector acquisition unit 202E8 on the motion vectors of all the duplicate vertices.

Here, in a case where the All skip mode signal indicates No, the Skip mode signal has two values for each duplicate vertex and is one bit.

The Skip mode signal is a signal for copying the motion vector of the duplicate vertex without decoding the motion vectors of the vertices from the bit stream in a case where the All skip mode signal indicates Yes (for example, having a value of 1).

The Skip mode signal is a signal for performing processing similar to that of the inter decoding unit 202E illustrated in FIG. 9 without performing the processing in the motion vector acquisition unit 202E8 for the motion vectors of the vertices in a case where the All skip mode signal indicates No (for example, having a value of 0).

Note that the above-described Skip mode signal may be directly decoded from the bit stream, or data (for example, an index of the duplicate vertex) specifying the duplicate vertex for which the processing similar to that of the inter decoding unit 202E illustrated in FIG. 9 is to be performed may be decoded from the bit stream, and the Skip mode signal may be calculated from the data.

Furthermore, a motion vector decoding method for the vertex may be determined similarly to the case described above by using the data (for example, the index of the duplicate vertex) specifying the duplicate vertex for which the processing similar to that of the inter decoding unit 202E illustrated in FIG. 9 is to be performed without calculating the Skip mode signal.

The duplicate vertex search unit 202E6 is configured to search for indices of vertices (hereinafter, referred to as duplicate vertex) whose coordinates match each other from geometric information of the decoded base mesh of the reference frame and store the indices in a buffer (not illustrated).

Specifically, inputs of the duplicate vertex search unit 202E6 are the index (decoding order) and position coordinates of each vertex of the decoded base mesh of the reference frame.

Furthermore, an output of the duplicate vertex search unit 202E6 is a list of pairs of an index (vindex0) of a vertex for which the duplicate vertex exists and an index (vindex1) of the duplicate vertex. Here, such a list of pairs is stored in a buffer repVert in an order of index0.

In addition, since the vertex of vindex1 has been decoded before vindex0, a relationship of vindex0>vindex1 is established.

As a method of finding the duplicate vertex in the base mesh of the reference frame, not the position coordinates but the index of the duplicate vertex is decoded by a special signal with respect to the vertex for which the duplicate vertex exists. By such a special signal, a pair of the index of the corresponding vertex and the index of the duplicate vertex can be stored in the decoding order.

The duplicate vertex determination unit 202E7 is configured to determine whether or not there is a duplicate vertex among the decoded vertices for the corresponding vertex.

Here, if the index of the corresponding vertex is included in the indices of the vertices for which the duplicate vertices exist, the duplicate vertex determination unit 202E7 determines that there is a duplicate vertex among the decoded vertices. Note that, since the corresponding vertex comes in the decoding order, the above-described search is unnecessary.

Here, in a case where the duplicate vertex determination unit 202E7 determines that no duplicate vertex exists for the corresponding vertex, the processing similar to that of the inter decoding unit 202E illustrated in FIG. 9 is performed.

In a case where the duplicate vertex for the corresponding vertex exists, the motion vector acquisition unit 202E8 is configured to acquire a motion vector of a vertex having the same index as that of the duplicate vertex from the motion vector buffer unit 202E2 that stores the decoded motion vector and set the motion vector as the motion vector of the corresponding vertex in a case where the All skip mode signal indicates Yes or in a case where the All skip mode signal indicates No and a case where the Skip mode signal indicates Yes.

Here, in a case where the All skip mode signal indicates No and the Skip mode signal of the corresponding vertex indicates No, the processing similar to that of the inter decoding unit 202E illustrated in FIG. 9 is performed instead of the processing in the motion vector acquisition unit 202E8.

According to such a configuration, it is possible to expect an effect of reducing decoding calculation of the motion vectors and a code amount for the vertex for which the duplicate vertex exists.

In the above-described further modified example of the inter decoding unit 202E, the inter decoding unit 202E acquires a correspondence between the vertex of the reference frame and the vertex of the frame to be decoded from the decoded base mesh of the reference frame.

Then, the inter decoding unit 202E is configured not to encode the connectivity information of the vertex of the frame to be decoded based on the correspondence and to make the connectivity information identical to the connectivity information of the decoded vertex of the reference frame.

Furthermore, the inter decoding unit 202E divides the base mesh of the frame to be decoded into two types of regions based on signals in the decoding order of the vertices of the reference frame. In a first region, decoding is performed using inter processing, and in a second region, decoding is performed using intra processing.

Note that the above-described region is defined as a region formed by a plurality of vertices continuous in the decoding order when decoding the base mesh of the reference frame.

In addition, the following two implementations are assumed as means for decoding the coordinates of the vertex of the base mesh of the frame to be decoded using the signals.

(Means 1)

In Means 1, the signals are vertex_idx1, vertex_idx2, and intra_flag.

Here, vertex_idx1 and vertex_idx2 are indices (vertex indices) of the decoding order of the vertices, and intra_flag is a flag indicating whether an inter decoding method or an intra decoding method is used. There may be a plurality of such signals.

That is, vertex_idx1 and vertex_idx2 are vertex indices that define a start position and an end position of the above-described partial region (the first region and the second region).

(Means 2)

In Means 2, there is a premise that the connectivity information of the base mesh of the reference frame is decoded by Edgebreaker, and the decoding order of the coordinates of the vertices is set to an order determined by Edgebreaker.

FIG. 20 is a diagram illustrating an example of an operation of determining the connectivity information and the order of the vertices using Edgebreaker.

In FIG. 20, arrows indicate the decoding order of the connectivity information, a number indicates the decoding order of the vertex, and the same region is defined by an arrow of the same line type.

In Means 2, the signal is only intra_flag which is a flag indicating whether the inter decoding method or the intra decoding method is used.

That is, in Means 2, the inter decoding unit 202E is configured to divide the base mesh into the first region and the second region using Edgebreaker.

<Subdivision Unit 203>

The subdivision unit 203 is configured to generate and output added subdivided vertices and connectivity information thereof from the base mesh decoded by the base mesh decoding unit 202 by the subdivision method indicated by the control information.

Here, the base mesh, the added subdivided vertices, and the connectivity information thereof are collectively referred to as "subdivided mesh".

The subdivision unit 203 is configured to specify a type of the subdivision method from division_method_id which is the control information generated by decoding the base mesh bit stream.

Hereinafter, the subdivision unit 203 will be described with reference to FIGS. 3A and 3B.

Figure 3B:
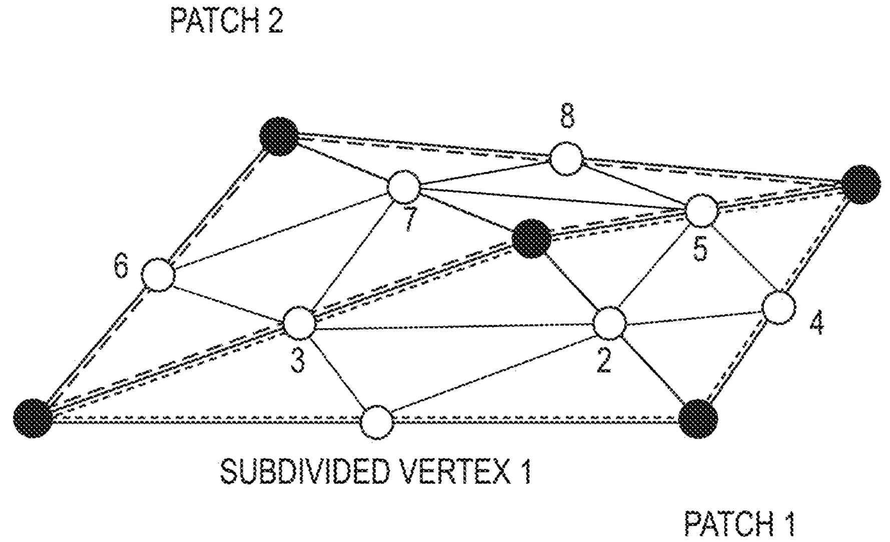
FIG. 3B is a diagram illustrating an example of the base mesh and the subdivided mesh.

FIGS. 3A and 3B are diagrams for explaining an example of an operation of generating the subdivided vertex from the base mesh.

FIG. 3A is a diagram illustrating an example of the base mesh including five vertices.

Here, for subdivision, for example, a mid-edge division method of connecting midpoints of edges in each base face may be used. As a result, a certain base face is divided into four faces.

FIG. 3B illustrates an example of the subdivided mesh obtained by dividing the base mesh including five vertices. In the subdivided mesh illustrated in FIG. 3B, eight subdivided vertices (white circles) are generated in addition to the original five vertices (black circles).

As the displacement decoding unit 206 decodes a displacement for each subdivided vertex generated in this manner, improvement in encoding performance can be expected.

In addition, a different subdivision method may be applied to each patch. Therefore, the displacement decoded by the displacement decoding unit 206 is adaptively changed for each patch, and the improvement in encoding performance can be expected. Information regarding the divided patch is received as patch_id that is control information.

Hereinafter, the subdivision unit 203 will be described with reference to FIG. 21. FIG. 21 is a diagram illustrating an example of functional blocks of the subdivision unit 203.

As illustrated in FIG. 22, the subdivision unit 203 includes a base mesh subdivision unit 203A and a subdivided mesh adjustment unit 203B.

(Base Mesh Subdivision Unit 203A)

The base mesh subdivision unit 203A is configured to calculate the number of divisions (the number of subdivisions) for each of the base face and the base patch based on the input base mesh and division information of the base mesh, subdivide the base mesh based on the number of divisions, and output a subdivided face.

That is, the base mesh subdivision unit 203A may be configured such that the above-described number of divisions can be changed in units of base faces and base patches.

Here, the base face is a face included in the base mesh, and the base patch is a set of several base faces.

Furthermore, the base mesh subdivision unit 203A may be configured to predict the number of subdivisions of the base face, and calculate the number of subdivisions of the base face by adding a predicted division number residual to the predicted number of subdivisions of the base face.

Furthermore, the base mesh subdivision unit 203A may be configured to calculate the number of subdivisions of the base face based on the number of subdivisions of a base face adjacent to the base face.

Furthermore, the base mesh subdivision unit 203A may be configured to calculate the number of subdivisions of the base face based on the number of subdivisions of the base face accumulated immediately before.

Furthermore, the base mesh subdivision unit 203A may be configured to generate vertices that divide three edges forming the base face, and subdivide the base face by connecting the generated vertices.

As illustrated in FIG. 22, the subdivided mesh adjustment unit 203B described below is provided at a position downstream of the base mesh subdivision unit 203A.

Hereinafter, an example of processing in the base mesh subdivision unit 203A will be described with reference to FIGS. 22 to 24.

FIG. 22 is a diagram illustrating an example of functional blocks of the base mesh subdivision unit 203A, and FIG. 24 is a flowchart illustrating an example of an operation of the base mesh subdivision unit 203A.

As illustrated in FIG. 22, the base mesh subdivision unit 203A includes a base face division number buffer unit 203A1, a base face division number reference unit 203A2, a base face division number prediction unit 203A3, an addition unit 203A4, and a base face division unit 203A5.

The base face division number buffer unit 203A1 stores division information of the base face including the number of divisions of the base face, and is configured to output the division information of the base face to the base face division number reference unit 203A2.

Here, a size of the base face division number buffer unit 203A1 may be set to 1, and the number of divisions of the base face accumulated immediately before may be output to the base face division number reference unit 203A2.

That is, by setting the size of the base face division number buffer unit 203A1 to 1, only the number of last decoded subdivisions (the number of subdivisions decoded immediately before) may be referred to.

The base face division number reference unit 203A2 is configured to output "non-referable" to the base face division number prediction unit 203A3 in a case where the base face adjacent to the base face to be decoded does not exist, or in a case where the base face adjacent to the base face to be decoded exists but the number of divisions is not fixed.

On the other hand, the base face division number reference unit 203A2 is configured to output the number of divisions to the base face division number prediction unit 203A3 in a case where the base face adjacent to the base face to be decoded exists and the number of divisions is fixed.

The base face division number prediction unit 203A3 is configured to predict the number of divisions (the number of subdivisions) of the base face based on one or more input numbers of divisions, and output the predicted number of divisions (predicted division number) to the addition unit 203A4.

Here, the base face division number prediction unit 203A3 is configured to output 0 to the addition unit 203A4 in a case where only "non-referable" is input from the base face division number reference unit 203A2.

Note that the base face division number prediction unit 203A3 may be configured to generate, in a case where one or more numbers of divisions are input, the predicted division number by using any one of statistical values such as an average value, a maximum value, a minimum value, and a mode value of the input number of divisions.

Note that the base face division number prediction unit 203A3 may be configured to generate the number of divisions of the most adjacent face as the predicted division number in a case where one or more numbers of divisions are input.

The addition unit 203A4 is configured to output, to the base face division unit 203A5, the number of divisions obtained by adding the predicted division number residual decoded from a predicted residual bit stream and the predicted division number acquired from the base face division number prediction unit 203A3.

The base face division unit 203A5 is configured to subdivide the base face based on the number of divisions input from the addition unit 203A4.

FIG. 23 illustrates an example of a case where the base face is divided into nine. A method of dividing the base face by the base face division unit 203A5 will be described with reference to FIG. 23.

The base face division unit 203A5 generates points A_1, . . . , and A_(N−1) equally dividing an edge AB forming the base face into N (N=3).

Similarly, the base face division unit 203A5 equally divides an edge BC and an edge CA into N, and generates respective points B_1, . . . , B_(N−1), C_1, . . . , and C_(N−1).

Hereinafter, points on the edge AB, the edge BC, and the edge CA are referred to as "edge division points".

The base face division unit 203A5 generates edges A_i B_(N−i), B_i C_(N−i), and C_i A (N−i) for all i (i=1, 2, . . . , and N−1), and generates $N^2$ subdivided faces. This division method is hereinafter referred to as an $N^2$ division method. The $N^2$ division method is equivalent to the mid-edge division method when N=2.

Next, a processing procedure of the base mesh subdivision unit 203A will be described with reference to FIG. 24.

In step S2201, it is determined whether or not division processing has been completed for the last base face. In a case where the processing has been completed, the processing procedure ends, and if the processing has not been completed, the processing procedure proceeds to step S2202.

In step S2202, the base mesh subdivision unit 203A determines whether or not Depth <mdu_max_depth.

Here, Depth is a variable representing a current depth, an initial value thereof is 0, and mdu_max_depth represents a maximum depth determined for each base face.

In a case where the condition in step S2202 is satisfied, the processing procedure proceeds to step S2203, and in a case where the condition is not satisfied, the processing procedure returns to step S2201.

In step S2203, the base mesh subdivision unit 203A determines whether or not mdu_division_flag at the current depth is 1.

In the case of Yes, the processing procedure proceeds to step S2201, and in the case of No, the processing procedure proceeds to step S2204.

In step S2204, the base mesh subdivision unit 203A further subdivides all the subdivided faces in the base face.

Here, the base mesh subdivision unit 203A subdivides the base face in a case where subdivision processing has never been performed on the base face.

Note that the subdivision method is similar to the method described in step S2204.

Specifically, in a case where the base face has never been subdivided, the base face is subdivided as illustrated in FIG. 23. In a case where the base face has been subdivided at least once, the subdivided face is subdivided into $N^2$. In the example of FIG. 23, a face having a vertex A_2, a vertex B, and a vertex B_1 is divided by the $N^2$ division method as in the division of the base face to generate $N^2$ faces.

When the subdivision processing ends, the processing procedure proceeds to step S2205.

In step S2205, the base mesh subdivision unit 203A adds 1 to Depth, and the processing procedure returns to step S2202.

Furthermore, the base mesh subdivision unit 203A may perform the subdivision processing so as to subdivide all the base faces by the same upper limit number of times of subdivision mdu_max_depth. At this time, the subdivision processing per one time may be configured to perform subdivision using the $N^2$ division method based on the number of subdivisions mdu_subdivision_num. (Subdivided mesh Adjustment Unit 203B)

Next, a specific example of processing performed by the subdivided mesh adjustment unit 203B will be described. Hereinafter, an example of processing performed by the subdivided mesh adjustment unit 203B will be described with reference to FIGS. 24 to 28.

FIG. 25 is a diagram illustrating an example of functional blocks of the subdivided mesh adjustment unit 203B.

As illustrated in FIG. 25, the subdivided mesh adjustment unit 203B includes an edge division point moving unit 701 and a subdivided face division unit 702.

(Edge Division Point Moving Unit 701)

The edge division point moving unit 701 is configured to move an edge division point of the base face to any one of edge division points of adjacent base faces with respect to an input initial subdivided face, and output the subdivided face.

FIG. 26 illustrates an example in which an edge division point on a base face ABC is moved. For example, as illustrated in FIG. 26, the edge division point moving unit 701 may be configured to move the edge division point of the base face ABC to an edge division point of the closest adjacent base face.

(Subdivided Face Division Unit 702)

The subdivided face division unit 702 is configured to subdivide the input subdivided face again and output a decoded subdivided face.

FIG. 27 is a diagram illustrating an example of a case where a subdivided face X in the base face is subdivided again.

As illustrated in FIG. 27, the subdivided face division unit 702 may be configured to generate a new subdivided face in the base face by connecting a vertex forming the subdivided face and an edge division point of an adjacent base face.

FIG. 28 is a diagram illustrating an example of a case where the above-described subdivision processing is performed on all the subdivided faces.

The mesh decoding unit 204 is configured to generate and output a decoded mesh using the subdivided mesh generated by the subdivision unit 203 and the displacement decoded by the displacement decoding unit 206.

Specifically, the mesh decoding unit 204 is configured to generate the decoded mesh by adding a corresponding displacement to each subdivided vertex. Here, information regarding the subdivided vertex to which each displacement corresponds is indicated by the control information.

The patch integration unit 205 is configured to integrate and output a plurality of patches of the decoded mesh generated by the mesh decoding unit 204.

Here, a patch division method is defined by the mesh encoding device 100. For example, the patch division method may be configured such that a normal vector is calculated for each base face, a base face having the most similar normal vector among adjacent base faces is selected, both base faces are grouped as the same patch, and such a procedure is sequentially repeated for the next base face.

The video decoding unit 207 is configured to decode and output texture by video coding. For example, the video decoding unit 207 may use HEVC described in Non Patent Literature 1.

<Displacement Decoding Unit 206>

The displacement decoding unit 206 is configured to decode the displacement bit stream to generate and output the displacement.

In the example of FIG. 3B, since there are eight subdivided vertices, the displacement decoding unit 206 is configured to define eight displacements expressed by scalars or vectors for each subdivided vertex.

The displacement decoding unit 206 will be described below with reference to FIG. 29. FIG. 29 is a diagram illustrating an example of functional blocks of the displacement decoding unit 206.

As illustrated in FIG. 29, the displacement decoding unit 206 includes a control information decoding unit 206A, an arithmetic decoding unit 206B, a context value update unit 2060, a context buffer 206D, a context selection unit 206E, a multi-value conversion unit 206F, a coefficient level value decoding unit 206F2, an inter prediction unit 206G, a frame buffer 206H, an adder 206I, an inverse quantization unit 206J, and a displacement prediction addition unit 206K.

Hereinafter, an example of a configuration of the displacement bit stream will be described with reference to FIG. 30. FIG. 30 is a diagram illustrating an example of the configuration of the displacement bit stream.

As illustrated in FIG. 30, first, the displacement bit stream may include a displacement parameter set (DPS) which is a set of control information related to decoding of the displacement.

Second, the displacement bit stream may include a displacement patch header (DPH) which is a set of control information corresponding to the patch.

Third, the displacement bit stream may include, next to the DPH, an encoded displacement which forms the patch.

As described above, the displacement bit stream has a configuration in which one DPH and one DPS correspond to each encoded displacement.

Note that the configuration in FIG. 30 is merely an example. If the DPH and the DPS correspond to each encoded displacement, elements other than the above may be added as constituent elements of the displacement bit stream.

For example, as illustrated in FIG. 30, the displacement bit stream may include a sequence parameter set (SPS).

FIG. 31 is a diagram illustrating an example of a syntax configuration of the DPS.

A Descriptor column in FIG. 31 indicates how each syntax is encoded.

Further, in FIG. 31, ue(v) means an unsigned 0-order exponential-Golomb code, and u(n) means a n-bit flag. In a case where there is a plurality of DPSs, the DPS includes at least DPS id information (dps_displacement_parameter_set_id) for identifying each DPS.

Further, the DPS may include a flag (interprediction_enabled_flag) that controls whether or not to perform inter-prediction.

For example, when interprediction_enabled_flag is 0, it may be defined that the inter-prediction is not performed, and when interprediction_enabled_flag is 1, it may be defined that the inter-prediction is performed. When interprediction_enabled_flag is not included, it may be defined that the inter-prediction is not performed. Furthermore, the DPS may include a flag (wavelet_transform_flag) that controls whether or not to perform wavelet transform.

For example, when wavelet_transform_flag is 0, it may be defined that the wavelet transform is not performed, and when wavelet_transform_flag is 1, it may be defined that the wavelet transform is performed. When wavelet_transform_flag is not included, it may be defined that the wavelet transform is performed.

Furthermore, the DPS may include a flag (displacement_prediction_addition_flag) that controls whether or not to perform displacement prediction addition.

For example, when displacement_prediction_addition_flag is 0, it may be defined that the displacement prediction addition is not performed, and when displacement_prediction_addition_flag is 1, it may be defined that the displacement prediction addition is performed. When displacement_prediction_addition_flag is not included, it may be defined that displacement prediction addition is not performed.

The DPS may include a flag (dct_enabled_flag) that controls whether or not to perform inverse DCT.

For example, when dct_enabled_flag is 0, it may be defined that the inverse DCT is not performed, and when dct_enabled_flag is 1, it may be defined that the inverse DCT is performed. When dct_enabled_flag is not included, it may be defined that the inverse DCT is not performed.

The syntax configuration will be described below with reference to FIGS. 34 to 36.

First, at the time of encoding, a coefficient level value of the displacement is represented by a matrix of a size of 3×N in each frame. 3 denotes a dimension in a spatial domain and N denotes the total number of subdivided vertices. Such a matrix is divided into blocks and encoded in units of blocks.

A block size may be a size of 3×n (n<N) or a size of 1×n. Alternatively, the size of 1×n and a size of 2×n may be used in combination as the block size. For matrix elements whose size is less than the block size, the block has a maximum size of d×m (d=1, 2, and 3, and m<n).

FIG. 32 is a diagram illustrating an example of a syntax configuration. A syntax is defined in units of matrices or in units of blocks.

First, the syntax defined in units of matrices will be described.

lastt_sig_coeff_prefix represents a prefix of a coordinate position of a leading non-zero coefficient in a scan order. lastt_sig_coeff_suffix represents a suffix of the coordinate position of the leading non-zero coefficient in the scan order.

For example, the prefix is expressed by truncated rice binarization, and the suffix is expressed by a fixed length. FIG. 33 is a diagram illustrating a prefix code string and a suffix code string in a case where a maximum value is 32.

Second, the syntax defined in units of blocks will be described.

coded_block_flag is a flag indicating that there is a non-zero coefficient in the block. Only one such flag is defined for each block.

last_sig_coeff_block_prefix represents a prefix of a coordinate position of the leading non-zero coefficient in the scan order in the block.

last_sig_coeff_block_suffix represents a suffix of a coordinate position of the leading non-zero coefficient in the scan order in the block. sig_coeff_flag is a flag indicating whether or not the coefficient is a non-zero coefficient.

coeff_abs_level_greater1_flag is a flag indicating whether or not an absolute value of the coefficient (non-zero coefficient) is 2 or more. The total number of coefficients represented by such a flag may be provided with, for example, an upper limit such as eight.

coeff_abs_level_greater2_flag is a flag indicating whether or not an absolute value of the leading coefficient (non-zero coefficient) having the absolute value of 2 or more in the scan order is 3 or more. coeff_sign_flag is a flag indicating a positive or negative sign of the coefficient.

coeff_abs_level_remaining represents a value obtained by subtracting the value expressed by the above-described flag from the absolute value of the coefficient. coeff_abs_level_remaining is expressed by, for example, a k-th order exponential Golomb code.

FIG. 34 is a diagram illustrating a prefix code string and a suffix code string according to the k-th order exponential Golomb code.

FIGS. 35 and 36 are diagrams illustrating specific examples of a syntax configuration. The coefficient level values are decoded from each syntax as illustrated in FIG. 35, and then the decoded coefficient level values are rearranged as illustrated in FIG. 36.

FIG. 37 is a diagram illustrating an example of a syntax configuration of the DPH.

As illustrated in FIG. 37, the DPH includes at least DPS id information for designating the DPS corresponding to each DPH.

The control information decoding unit 206A is configured to output the control information by performing variable length decoding on the received displacement bit stream.

(Arithmetic Decoding Unit 206B)

The arithmetic decoding unit 206B is configured to output a binarized coefficient level value by performing arithmetic decoding on the received displacement bit stream. Details thereof will be described below.

The arithmetic decoding unit 206B targets a binary value. The arithmetic decoding unit 206B defines a number line from 0 to 1, and divides and uses the section. The section is divided by a binary occurrence probability (hereinafter, referred to as a context value).

A binary fraction is input to the arithmetic decoding unit 206B, and the arithmetic decoding unit 206B decodes the original value according to which section on the number line the binary fraction is included.

Here, the context value may be always fixed or may be changed for each bit of an input signal. In a case where the context value is changed for each bit, the arithmetic decoding unit 206B receives the context value from the context selection unit 206E.

(Context Value Update Unit 206C)

The context value update unit 206C is configured to update the context value by using the binarized coefficient level value and output the updated context value to the context buffer 206D.

The context value update unit 206C updates the context value each time 1 bit is decoded.

Here, the context value update unit 206C sets a symbol having a high occurrence probability among 0 and 1 as a most probable symbol (MPS), and sets a symbol having a low occurrence probability as a least probable symbol (LPS).

The context value update unit 206C may use a probability update table that slightly updates a probability value when the MPS occurs and greatly updates the probability value when the LPS occurs.

(Context Selection Unit 206E)

The context selection unit 206E is configured to generate and output the context value (the context value for output) by using the context value, a bit position, and the syntax read from the context buffer 206D. Details thereof will be described below.

last_sig_coeff_prefix: The context selection unit 206E may create a context number table according to a matrix size or the bit position as illustrated in FIG. 38.

last_sig_coeff_block_prefix: The context selection unit 206E may create a context number table according to the block size or the bit position as illustrated in FIG. 38.

coded_block_flag: The context selection unit 206E may set a context number to 0 if coded_block_flag=0, and may set the context number to 1 if coded_block_flag=1 in the decoded right adjacent block as illustrated in FIG. 39.

sig_coeff_flag: The context selection unit 206E sets, as the context number, a value obtained by correcting a certain reference value by a position of the coefficient or coded_block_flag of the decoded right adjacent block. For example, the context selection unit 206E sets the reference value to 0 in the leftmost block and sets the reference value to 3 in the other blocks, for example. For the correction of the context number, the context selection unit 206E may use tables as illustrated in FIGS. 40-1 and 40-3 in a case where coded_block_flag=0 in the decoded right adjacent block, and may use a table as illustrated in FIG. 40-2 in a case where coded_block_flag=1.

coeff_abs_level_greater1_flag and coeff_abs_level_greater2_ flag: The context selection unit 206E may set the context number to 0 in a case where there is a coefficient whose absolute value (level value) is 2 or more in the decoded right adjacent block, and set the context number to 1 in a case where there is no coefficient having whose absolute value (level value) is 2 or more.

The context buffer 206D is configured to output them according to control information (not illustrated).

The multi-value conversion unit 206F is configured to generate and output a coefficient level value by multi-value conversion of the binarized coefficient level value. The generated (calculated) coefficient level value is also output to the context buffer 206D as the bit position and the syntax.

The inter prediction unit 206G is configured to generate and output a predicted displacement by using the reference frame read from the frame buffer 206H.

The frame buffer 206H is configured to acquire and accumulate a decoded displacement. The frame buffer H is configured to output the decoded displacement at a corresponding vertex in the reference frame according to the control information (not illustrated).

(Operation of Coefficient Level Value Decoding Unit 206F2)

Hereinafter, an example of an operation of the coefficient level value decoding unit 206F2 will be described with reference to FIG. 41.

As illustrated in FIG. 41, in step S101, the coefficient level value decoding unit 206F2 decodes all coefficients after positions indicated by last_sig_coeff_prefix and last_sig_coeff_suffix as 0. The subsequent processing is performed in units of blocks.

In step S102, the coefficient level value decoding unit 206F2 performs decoding for coded_block_flag.

In step S103, the coefficient level value decoding unit 206F2 determines whether coded_block_flag is 0 or 1.

In a case where coded_block_flag=0, the coefficient level value decoding unit 206F2 decodes all the coefficients in the currently processed block as 0, and the operation proceeds to step S116. In a case where coded_block_flag=1, the operation proceeds to step S104.

In step S104, the coefficient level value decoding unit 206F2 decodes all the coefficients after the positions indicated by last_sig_coeff_block_prefix and last_sig_coeff_block_suffix in the currently processed block as 0.

In step S105, the coefficient level value decoding unit 206F2 performs decoding for sig_coeff_flag.

In step S106, the coefficient level value decoding unit 206F2 determines whether sig_coeff_flag is 0 or 1.

In a case where sig_coeff_flag=0, the operation proceeds to step S116, and in a case where sig_coeff_flag=1, the operation proceeds to step S107.

In step S107, the coefficient level value decoding unit 206F2 performs decoding for coeff_abs_level_greater1_flag.

In step S108, the coefficient level value decoding unit 206F2 determines whether coeff_abs_level_greater1_flag is 0 or 1.

In a case where coeff_abs_level_greater1_flag=0, the operation proceeds to step S113, and in a case where coeff_abs_level_greater1_flag=1, the operation proceeds to step S109.

In step S109, the coefficient level value decoding unit 206F2 performs decoding for coeff_abs_level_greater2_flag.

In step S110, the coefficient level value decoding unit 206F2 determines whether coeff_abs_level_greater2_flag is 0 or 1.

In a case where coeff_abs_level_greater2_flag=0, the operation proceeds to step S113, and in a case where coeff_abs_level_greater1_flag=1, the operation proceeds to step S112.

In step S112, the coefficient level value decoding unit 206F2 performs decoding for coeff_abs_level_remaining. Here, for the decoding of coeff_abs_level_remaining, the coefficient level value decoding unit 206F2 sets, as the decoded coefficient level value, a value obtained by adding 3 after performing exponential Golomb decoding.

In step S113, the coefficient level value decoding unit 206F2 performs decoding for coeff_sign_flag.

In step S114, the coefficient level value decoding unit 206F2 determines whether coeff_sign_flag is 0 or 1.

In a case where coeff_sign_flag=0, the operation proceeds to step S116, and in a case where coeff_sign_flag=1, the operation proceeds to step S115.

In step S115, the coefficient level value decoding unit 206F2 negates the decoded coefficient.

In step S116, the coefficient level value decoding unit 206F2 determines whether or not the currently processed block is the last block.

In the case of Yes, the operation ends, and in the case of No, the operation proceeds to step S111.

In step S111, the coefficient level value decoding unit 206F2 proceeds the operation to processing for the next block, and the operation returns to step S102.

Next, an example of operations of the arithmetic decoding unit 206B, the context selection unit 206E, the context value update unit 2060, and the multi-value conversion unit 206F will be described with reference to FIG. 42.

Next, an example of the operations of the arithmetic decoding unit 206B, the context selection unit 206E, the context value update unit 2060, and the multi-value conversion unit 206F will be described with reference to FIG. 42.

As illustrated in FIG. 42, the arithmetic decoding unit 206B is initialized in step S201 and sets an initial context value in step S202.

The arithmetic decoding unit 206B selects a context in step S203, and performs arithmetic decoding in step S204.

In step S205, the context value update unit 2060 and the context selection unit 206E update the context value, and in step S206, the multi-value conversion unit 206F performs multi-value conversion.

In step S207, the multi-value conversion unit 206F determines whether or not all decoding has been completed. In the case of Yes, the operation proceeds to step S208, and in the case of No, the operation proceeds to step S203.

In step S208, the multi-value conversion unit 206F saves the context value.

(Inter Prediction Unit 206G)

The inter prediction unit 206G is configured to generate and output an inter prediction residual and an inter prediction displacement by performing the inter-prediction using the decoded displacement of the reference frame read from the frame buffer 206H.

The inter prediction unit 206G is configured to perform such inter-prediction only in a case where interprediction_enabled_flag is 1.

The inter prediction unit 206G may perform the inter-prediction in the spatial domain or may perform the inter-prediction in a frequency domain. In the inter-prediction, bidirectional prediction may be performed using a past reference frame and a future reference frame in terms of time.

In a case where the inter-prediction is performed in the spatial domain, the inter prediction unit 206G may determine the predicted displacement of the subdivided vertex in the target frame with reference to the decoded displacement of the corresponding subdivided vertex in the reference frame as it is.

Alternatively, a predicted displacement of a certain subdivided vertex in the target frame may be probabilistically determined according to a normal distribution in which an average and a variance are estimated by using decoded displacements of corresponding subdivided vertices in a plurality of reference frames. In this case, the variance may be uniquely determined only by the average as zero.

Alternatively, the predicted displacement of the certain subdivided vertex in the target frame may be determined based on a regression curve in which a time is estimated as an explanatory variable and the displacement is estimated as an objective variable by using the decoded displacements of the corresponding subdivided vertices in the plurality of reference frames.

In the mesh encoding device 100, an order of the decoded displacements may be rearranged for each frame in order to improve the encoding efficiency.

In such a case, the inter prediction unit 206G may be configured to perform the inter-prediction on the rearranged decoded displacements.

A correspondence of subdivided vertices between the reference frame and the frame to be decoded is indicated by the control information.

FIG. 43 is a diagram for explaining an example of a correspondence of subdivided vertices between the reference frame and the frame to be decoded in a case where the inter-prediction is performed in the spatial domain.

The adder 206I is configured to acquire the inter prediction residual and the inter prediction displacement from the inter prediction unit 206G. The adder 206I is configured to add the inter prediction residual and the inter prediction displacement to generate and output a quantized intra prediction residual. The generated (calculated) quantized intra prediction residual is also output to the frame buffer 206H.

The inverse quantization unit 206J is configured to perform inverse quantization on the quantized intra prediction residual acquired from the adder 206I and output an intra prediction residual.

(Displacement Prediction Addition Unit 206K)

The displacement prediction addition unit 206K is configured to decode the displacement by performing the intra prediction of the displacement of the subdivided vertex based on the base mesh output from the base mesh decoding unit 202 to calculate an intra prediction value, and adding the calculated intra prediction value and the intra prediction residual output from the inverse quantization unit 206J.

FIG. 44 is a flowchart illustrating an example of an operation of the displacement prediction addition unit 206K.

As illustrated in FIG. 44, in step S1, the displacement prediction addition unit 206K sets the current number of times of subdivision it to 1.

In step S2, the displacement prediction addition unit 206K determines whether or not the current number of times of subdivision it is less than the upper limit number of times of subdivision mdu_max_depth.

In the case of Yes, the operation proceeds to step S3, and in the case of No, the operation ends.

In step S3, the displacement prediction addition unit 206K determines whether or not the division has ended for all the edges.

In the case of Yes, the operation proceeds to step S8, and in the case of No, the operation proceeds to step S4.

In step S4, the displacement prediction addition unit 206K selects an undivided edge, and the operation proceeds to step S5.

In step S5, the displacement prediction addition unit 206K divides the selected edge based on the number of subdivisions mdu_division_num to generate the subdivided vertex.

In step S6, the displacement prediction addition unit 206K predicts the displacement of the subdivided vertex from displacements of vertices at both ends, and the operation proceeds to step S7.

Hereinafter, a method of predicting the displacement of the subdivided vertex will be described.

FIGS. 45 and 46 are diagrams schematically illustrating an example of dividing a line segment AB by the mid-edge division method to generate a subdivided vertex C and an example of calculating a displacement of the subdivided vertex C, respectively.

A method of predicting the displacement will be described with reference to FIGS. 45 and 46.

First, a normal vector of a vertex P (t=x) between an end point A (t=0) and an end point B (t=1) is calculated. Here, normal vectors of the end points A and B are set as $(a_x, a_y)$ and $(b_x, b_y)$, respectively, and the normal vector of the vertex P is calculated by linear interpolation. At this time, the normal vector of the vertex P can be calculated as $((1-t)a_x+tb_x, (1-t)a_y+tb_y)$. At this time, the normal vector may be calculated using another interpolation method such as spherical linear interpolation.

When the end point A and the end point B are vertices on the base mesh, the normal vectors of the end point A and the end point B are calculated by an average value of a normal of the base face adjacent to each vertex. In a case where the subdivision is not performed, the normal vector of the base face does not have to be calculated.

Second, an inclination orthogonal to the calculated normal vector is calculated, and the displacement of the subdivided vertex C is predicted by integrating in a section from the end point A to the subdivided vertex C. That is, the displacement in the case of predicting the displacement of the subdivided vertex C can be calculated by the following expression.

[Math. 3]

$$\text{(Displacement of the Subdivided Vertex } C) = \int_0^{\frac{1}{2}} \frac{(b_x - a_x)t + a_x}{(b_y - a_y)t + a_y} dt$$

Alternatively, the displacement of the subdivided vertex C may be predicted using a known interpolation method such as cosine interpolation, cubic interpolation, or Hermitian interpolation using the surrounding vertices of the base mesh or the decoded subdivided vertex as an input.

FIG. 47 illustrates an example of predicting a displacement of a subdivided vertex D using cubic interpolation. As illustrated in FIG. 47, a cubic curve may be calculated from four vertices around the subdivided vertex D, and the displacement of the subdivided vertex D may be predicted as a vector connecting a point on the curve and the subdivided vertex D.

Alternatively, the displacement of the subdivided vertex may be predicted using a statistical value such as an average value, a mode value, a maximum value, or a minimum value of the displacement of the already decoded vertex or subdivided vertex on the base face.

FIG. 48 illustrates an example in which an edge AB is divided to generate the subdivided vertex C after each of an edge KB, an edge BJ, an edge JK, an edge BF, and an edge FA is divided by the mid-edge division method.

For example, when predicting the displacement of the subdivided vertex C, a displacement on a point having the smallest distance may be used as a predicted value, an average value of displacements of surrounding vertices such as subdivided vertices A, B, D, E, G, and I may be used as the predicted value of the displacement, or a weighted average value of the displacements of the surrounding vertices may be used as the predicted value of the displacement.

In step S7, the displacement prediction addition unit 206K adds the predicted value and a displacement error to decode the displacement. Thereafter, the operation proceeds to step S3.

In step S8, the displacement prediction addition unit 206K adds 1 to the current number of times of subdivision it, and the operation proceeds to step S2.

<First Modification>

Hereinafter, a first modification of the above-described first embodiment will be described focusing on differences from the first embodiment described above with reference to FIG. 49.

FIG. 49 is a diagram illustrating an example of functional blocks of a displacement decoding unit 206 according to the first modification.

As illustrated in FIG. 49, the displacement decoding unit 206 according to the present Modification 1 includes an inverse quantization wavelet transform unit 206L instead of the inverse quantization unit 206J.

That is, in the first modification, an inverse quantization wavelet transform unit 206L is configured to perform inverse quantization wavelet transform on a quantized intra prediction residual output from an adder 206I to generate an intra prediction residual.

The mesh encoding device 100 and the mesh decoding device 200 described above may be implemented as programs that cause a computer to execute each function (each step).

According to the present embodiment, for example, comprehensive improvement in service quality can be realized in moving image communication, and thus, it is possible to contribute to the goal 9 "Build resilient infrastructure, promote inclusive and sustainable industrialization and foster innovation" of the sustainable development goal (SDGs) established by the United Nations.

The invention claimed is:

1. A mesh decoding device comprising a circuit that:

outputs a base mesh, outputs an intra prediction residual, and decodes a displacement by performing intra prediction of a displacement of a subdivided vertex based on the outputted base mesh to calculate an intra prediction value based on a normal vector calculated for the subdivided vertex, and adding the calculated intra prediction value and the outputted intra prediction residual.

2. The mesh decoding device according to claim 1, wherein the circuit decodes the displacement based on normal vectors of points at both ends of the subdivided vertex.

3. The mesh decoding device according to claim 1, wherein the circuit decodes the displacement based on a decoded displacement of the subdivided vertex.

4. A mesh decoding method comprising:

decoding a base mesh bit stream and generating and outputting a base mesh;

performing inverse quantization on a quantized intra prediction residual and outputting an intra prediction residual;

predicting a displacement of a subdivided vertex based on the base mesh output in the decoding and calculating an intra prediction value based on a normal vector calculated for the subdivided vertex; and decoding the displacement by adding the intra prediction residual output in the performing step and the intra prediction value calculated in the predicting step.

5. A program stored on a non-transitory computer-readable medium for causing a computer to function as a mesh decoding device, wherein the mesh decoding device includes a circuit that:

outputs a base mesh, outputs an intra prediction residual, and decodes a displacement by performing intra prediction of a displacement of a subdivided vertex based on the outputted base mesh to calculate an intra prediction value based on a normal vector calculated for the subdivided vertex, and adding the calculated intra prediction value and the outputted intra prediction residual.

* * * * *